(12) United States Patent
Matsushita et al.

(10) Patent No.: US 11,225,955 B2
(45) Date of Patent: Jan. 18, 2022

(54) ELECTRIC PUMP DEVICE

(71) Applicant: DENSO CORPORATION, Kariya (JP)

(72) Inventors: Yukihiro Matsushita, Kariya (JP); Keita Saito, Kariya (JP); Keita Kawai, Kariya (JP)

(73) Assignee: DENSO CORPORATION, Kariya (JP)

(*) Notice: Subject to any disclaimer, the term of this patent is extended or adjusted under 35 U.S.C. 154(b) by 181 days.

(21) Appl. No.: 16/615,767

(22) PCT Filed: Mar. 27, 2018

(86) PCT No.: PCT/JP2018/012373
§ 371 (c)(1),
(2) Date: Nov. 21, 2019

(87) PCT Pub. No.: WO2018/225342
PCT Pub. Date: Dec. 13, 2018

(65) Prior Publication Data
US 2020/0158098 A1 May 21, 2020

(30) Foreign Application Priority Data

Jun. 9, 2017 (JP) .............................. JP2017-114324
Jun. 14, 2017 (JP) .............................. JP2017-116785

(51) Int. Cl.
F04B 35/04 (2006.01)
F04B 39/08 (2006.01)
F04B 7/00 (2006.01)
F04B 39/10 (2006.01)

(52) U.S. Cl.
CPC ............ F04B 35/04 (2013.01); F04B 7/0038 (2013.01); F04B 7/0046 (2013.01); F04B 39/08 (2013.01); F04B 39/10 (2013.01)

(58) Field of Classification Search
CPC ...... F04B 7/0038; F04B 7/0046; F04B 39/08; F04B 39/10
USPC .................................................. 417/442, 502
See application file for complete search history.

(56) References Cited

U.S. PATENT DOCUMENTS

| | | | | |
|---|---|---|---|---|
| 1,508,806 A | * | 9/1924 | Silvestri | .................. F04B 49/00 417/502 |
| 4,195,631 A | * | 4/1980 | Baucom | .............. A61M 1/3693 137/625.15 |
| 4,412,519 A | * | 11/1983 | Hoch | ..................... F02M 41/10 123/449 |

(Continued)

FOREIGN PATENT DOCUMENTS

| JP | S47-16029 B | 5/1972 |
|---|---|---|
| JP | S51-32428 U | 3/1976 |

(Continued)

OTHER PUBLICATIONS

U.S. Appl. No. 16/615,774, filed Nov. 21, 2019 in the name of Yukihiro Matsushita et al.

Primary Examiner — Christopher S Bobish
(74) Attorney, Agent, or Firm — Oliff PLC

(57) ABSTRACT

An electric pump device includes a single motor, a pump that discharges fluid from a discharge port with driving force of the motor, and a flow passage switch that includes outlets configured to be in communication with the discharge port and switches an outlet of the outlets that is in communication with the discharge port with driving force of the motor.

16 Claims, 16 Drawing Sheets

(56) References Cited

U.S. PATENT DOCUMENTS

| | | | | |
|---|---|---|---|---|
| 4,632,648 A * | 12/1986 | Goyne | ................... | F16N 13/22 |
| | | | | 184/35 |
| 5,165,869 A * | 11/1992 | Reynolds | .............. | F04B 43/067 |
| | | | | 417/385 |
| 5,489,196 A * | 2/1996 | Lee | .......................... | F04B 9/14 |
| | | | | 417/239 |
| 6,955,531 B2 * | 10/2005 | Wu | ........................ | F04B 33/00 |
| | | | | 137/231 |
| 7,219,380 B2 * | 5/2007 | Beck | ................. | A61G 7/05776 |
| | | | | 137/625.46 |
| RE40,898 E * | 9/2009 | Huss | ..................... | D04B 35/28 |
| | | | | 417/442 |
| 10,641,401 B1 * | 5/2020 | Lopez | ................... | F16K 31/043 |
| 2008/0310977 A1 * | 12/2008 | Moreira | ............. | F04B 39/0005 |
| | | | | 417/415 |
| 2013/0255023 A1 | 10/2013 | Kikuta et al. | | |
| 2014/0271255 A1 * | 9/2014 | Rowe | ..................... | F04B 39/08 |
| | | | | 417/53 |
| 2015/0078940 A1 | 3/2015 | Kikuta et al. | | |
| 2016/0348670 A1 | 12/2016 | Sakohira et al. | | |
| 2017/0028968 A1 | 2/2017 | Kubota et al. | | |
| 2018/0372078 A1 | 12/2018 | Kawai | | |

FOREIGN PATENT DOCUMENTS

| | | |
|---|---|---|
| JP | S63-65966 A | 3/1988 |
| JP | 2002-240628 A | 8/2002 |
| JP | 2007-53448 A | 3/2007 |
| JP | 2013-79685 A | 5/2013 |
| WO | 2011/000213 A1 | 1/2011 |

\* cited by examiner

Fig.26A
Fig.26B
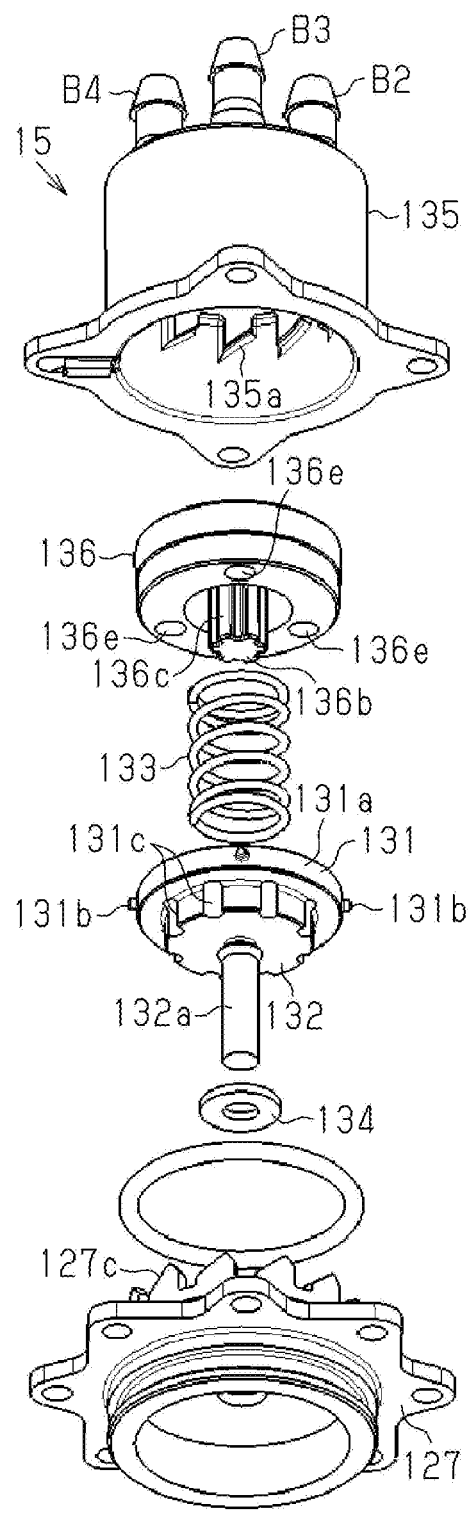
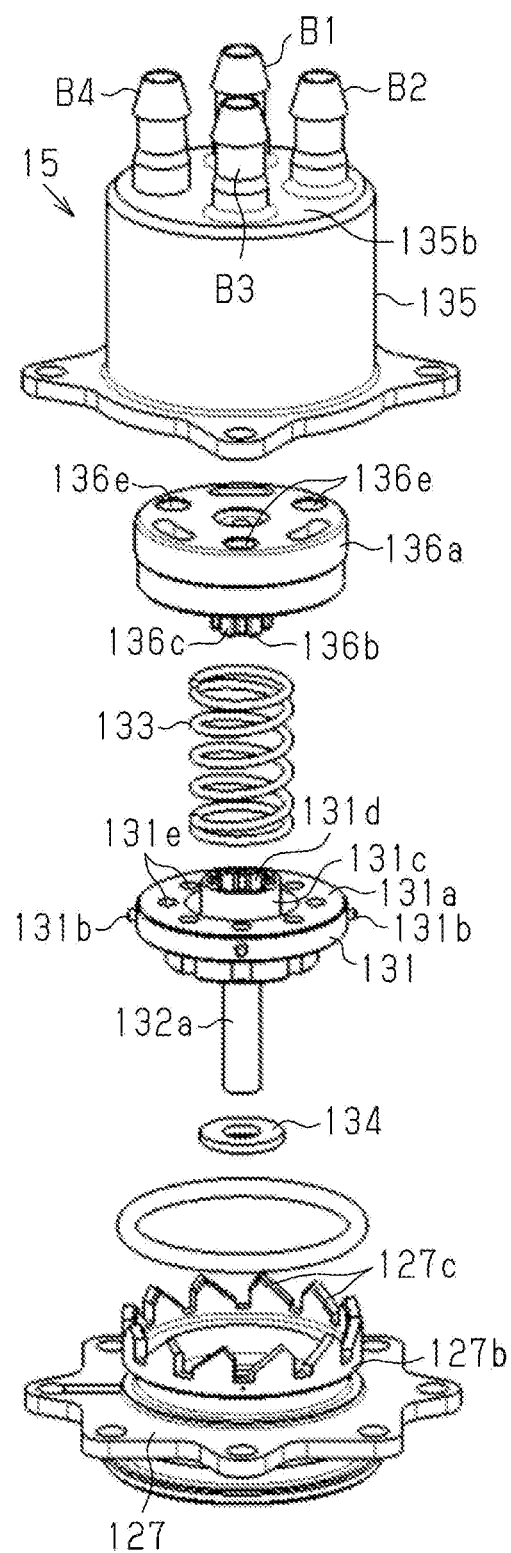

ELECTRIC PUMP DEVICE

TECHNICAL FIELD

The present disclosure relates to an electric pump device.

BACKGROUND ART

A typical electric pump device drives a piston in a cylinder with driving force of a motor to generate compressed air and discharges the compressed air from a discharge port of the cylinder so that the air is ejected toward a sensing surface (e.g., lens or cover glass) of an on-board sensor such as a camera from a nozzle port that is in communication with the discharge port (for example, refer to patent documents 1 and 2).

A recent vehicle may include multiple on-board sensors such as cameras, and a nozzle port may be arranged for each on-board sensor (for example, refer to patent document 3). In such a case, for example, an electric pump device may be arranged for each on-board sensor (each nozzle port) to eject fluid from the nozzle port.

When the area of a cover glass is relatively large, multiple nozzle ports may be arranged. The fluid may be divided at an upstream side of the nozzle ports and simultaneously ejected from the nozzle ports (for example, refer to patent document 4).

PRIOR ART DOCUMENTS

Patent Documents

Patent Document 1: International Patent Publication No. (WO)2015/159763
Patent Document 2: Japanese Laid-Open Patent Publication No. 2015-83830
Patent Document 3: Japanese Laid-Open Patent Publication No. 2007-53448
Patent Document 4: Japanese Laid-Open Patent Publication No. 2002-240628

SUMMARY OF THE INVENTION

Problems that the Invention is to Solve

However, in a configuration in which an electric pump device is arranged for each nozzle port such as that described above, multiple electric pump devices are necessary. This increases the volume and weight and furthermore increases the costs. Also, in a configuration in which fluid is divided and simultaneously ejected from nozzle ports such as that described above, a single electric pump device may be used. However, the ejection amount per nozzle port is decreased, so that the electric pump device needs to be enlarged. This also increases the volume and weight and furthermore increases the costs.

It is an object of the present disclosure to provide a compact electric pump device capable of feeding fluid to multiple locations.

Means for Solving the Problems

To achieve the above object, an electric pump device includes a single motor, a pump that discharges fluid from a discharge port with driving force of the motor, and a flow passage switch that includes outlets configured to be in communication with the discharge port and switches an outlet of the outlets that is in communication with the discharge port with driving force of the motor.

BRIEF DESCRIPTION OF THE DRAWINGS

FIGS. 26A and 26B are exploded perspective views of a flow passage switch shown in FIG. 23.

MODES FOR CARRYING OUT THE INVENTION

An embodiment of an on-board sensor cleaning device will now be described below with reference to FIGS. 1 to 14.

Figure 1:
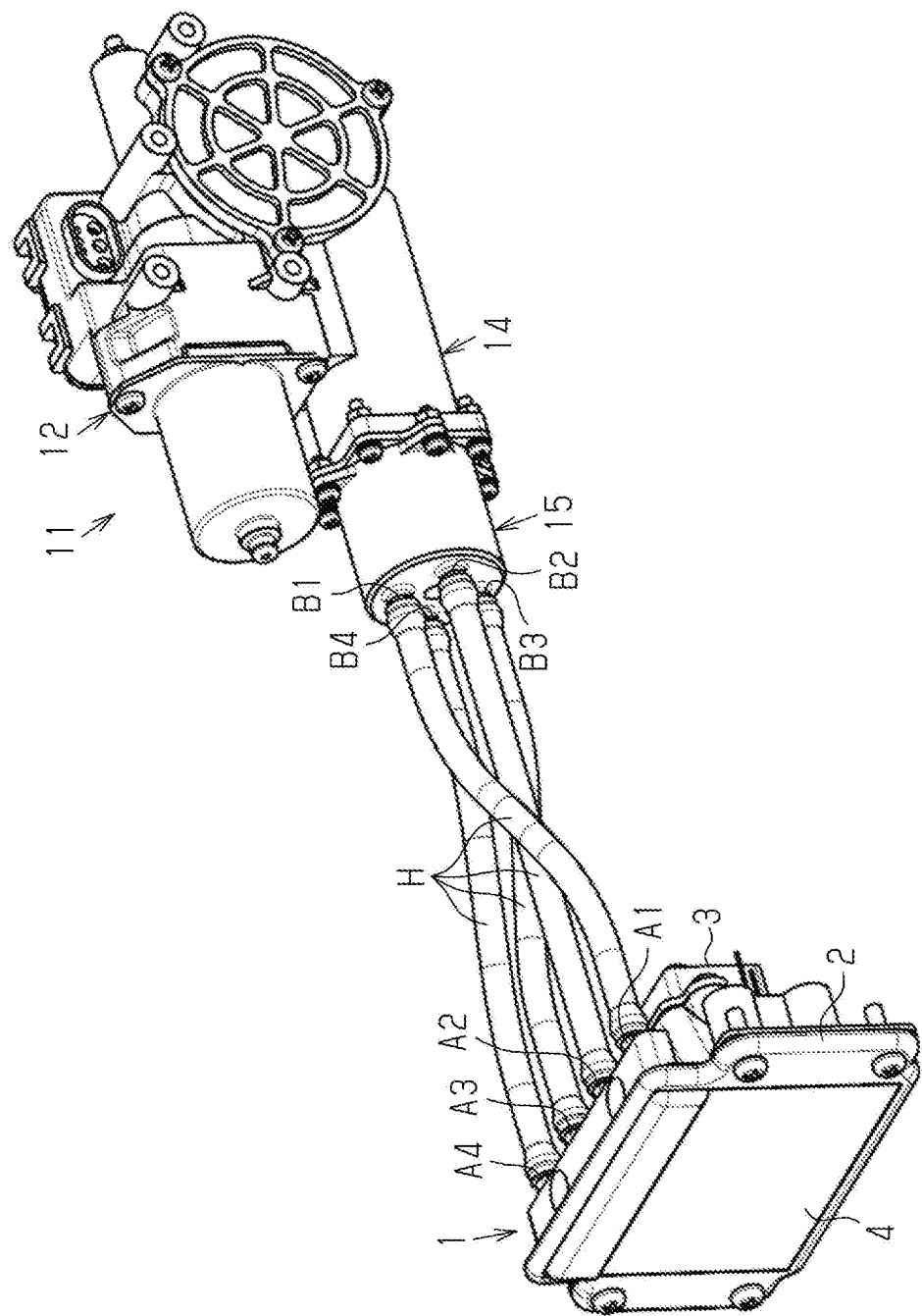
FIG. 1 is a perspective view showing a first embodiment of an on-board sensor cleaning device.

As shown in FIG. 1, a camera unit 1 installed on a vehicle includes a casing 2 and an on-board camera 3, which is fixed to the casing 2 and corresponds to an on-board sensor. The casing 2 is fixed to the vehicle. The casing 2 includes a cover glass 4, which is exposed to the exterior of the vehicle and corresponds to a sensing surface. The on-board camera 3 captures an image of the outside of the vehicle through the cover glass 4. In the present embodiment, the cover glass 4 includes a flat outer surface and has the form of a rectangle having horizontal sides that are longer than vertical sides.

Figure 2:
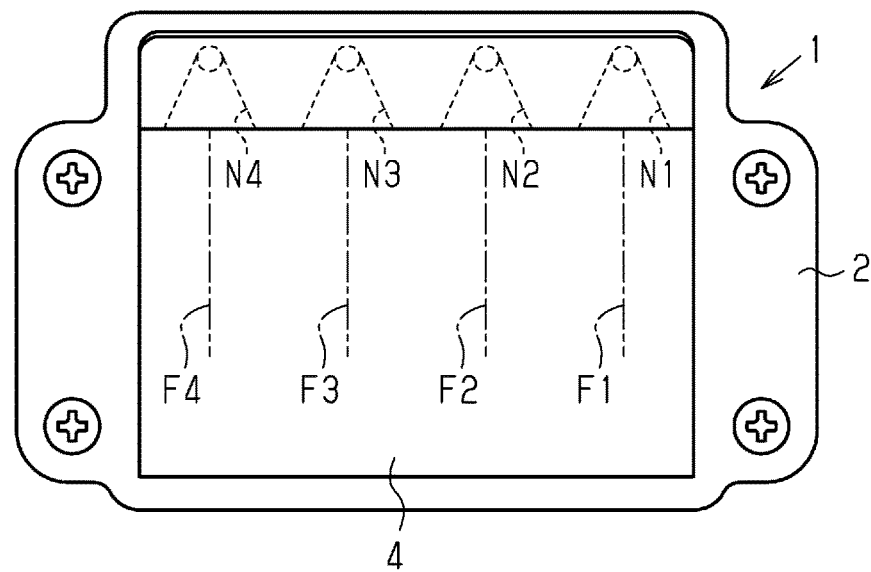
FIG. 2 is a front view of a camera unit shown in FIG. 1.

As shown in FIGS. 1 and 2, the casing 2 includes multiple (first to fourth) inlets A1 to A4 (refer to FIG. 1) and multiple (first to fourth) nozzle ports N1 to N4 (refer to FIG. 2) that are respectively (independently) in communication with the inlets A1 to A4. Each of the nozzle ports N1 to N4 is open so that fluid is ejected toward the cover glass 4. The nozzle ports N1 to N4 are arranged along one side (upper side) located at an antigravitational side of the cover glass 4 so that respective ejection axes F1 to F4 extend in the gravitational direction (are arranged in parallel) as viewed from the front of the cover glass 4. In the present embodiment, the nozzle ports N1 to N4 each have a width that increases toward its open end.

As shown in FIG. 1, the vehicle includes an electric pump device 11. The electric pump device 11 includes a single motor 12, a pump 14 that discharges the fluid from a discharge port 13 (refer to FIG. 4), which will be described later, with driving force of the motor 12, and a flow passage switch 15 including multiple (first to fourth) outlets B1 to B4 configured to be in communication with the discharge port 13. The flow passage switch 15 switches the outlets B1 to B4 that are in communication with the discharge port 13 with driving force of the motor 12. The first to fourth inlets A1 to A4 are in communication with the first to fourth outlets B1 to B4 via respective hoses H. When the electric pump device 11 is driven, the first to fourth nozzle ports N1 to N4 sequentially eject air (compressed air), which corresponds to fluid.

Figure 3:
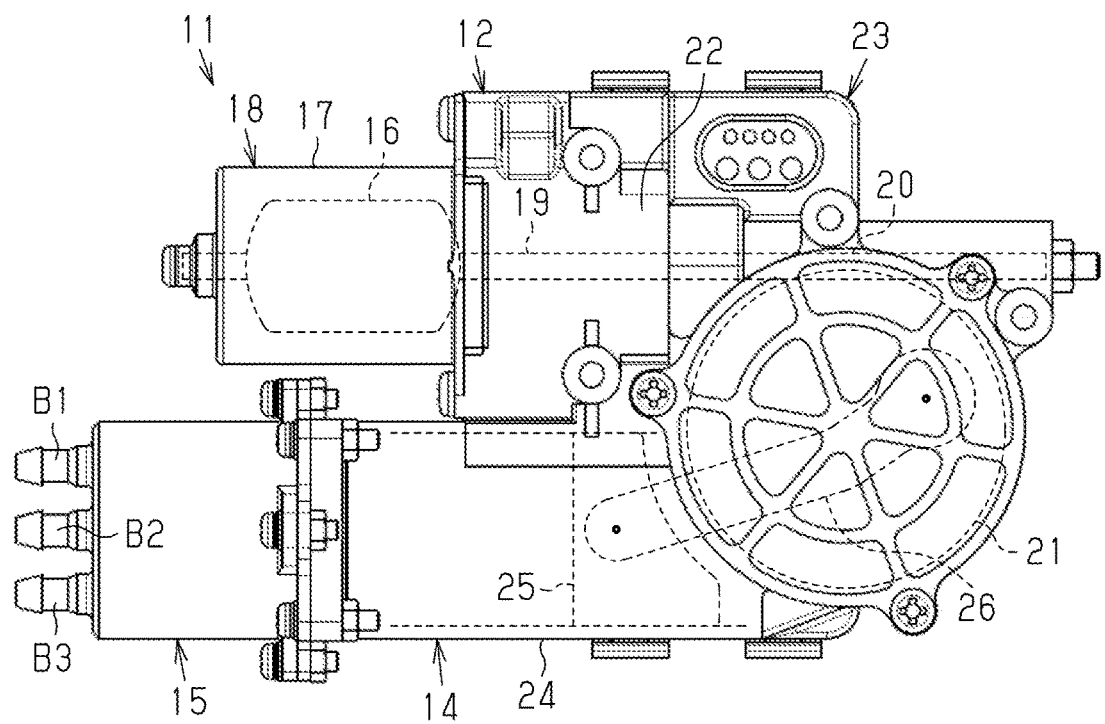
FIG. 3 is a plan view of an electric pump device shown in FIG. 1.

More specifically, as shown in FIG. 3, the motor 12 includes a motor body 18, in which a yoke 17 accommodates an armature 16, and a reduction unit 23, in which a gear housing 22 accommodates a worm 20 that rotates integrally with a rotation shaft 19 of the armature 16 and a worm wheel 21 that engages with the worm 20.

The pump 14 includes a tubular cylinder 24 formed integrally with the gear housing 22 and a piston 25 that reciprocates in the cylinder 24 with driving force of the motor 12. A transmission rod 26 has one end rotationally coupled to the worm wheel 21 on a position deviated from the axial center and the other end rotationally coupled to the piston 25. Thus, when the motor 12 is driven to rotate the worm wheel 21, the piston 25 reciprocates in the axial direction of the cylinder 24.

Figure 4:
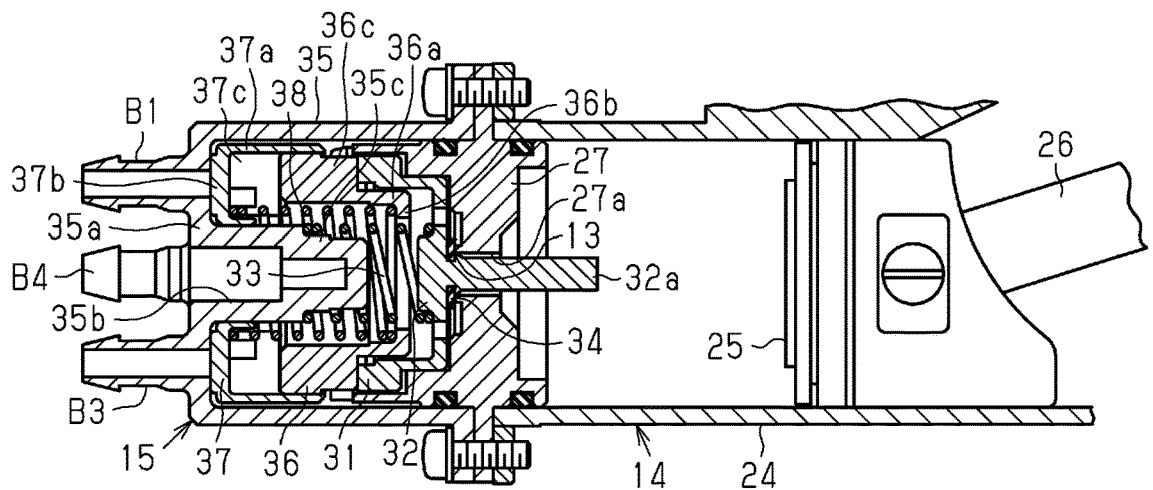
FIG. 4 is a partial cross-sectional view of the electric pump device shown in FIG. 3.
Figure 5:
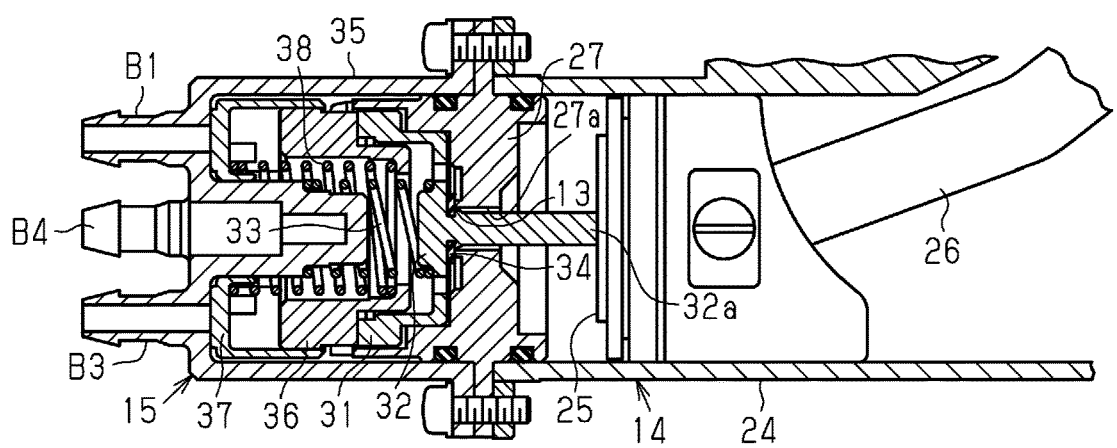
FIG. 5 is a partial cross-sectional view of the electric pump device shown in FIG. 3.
Figure 6:
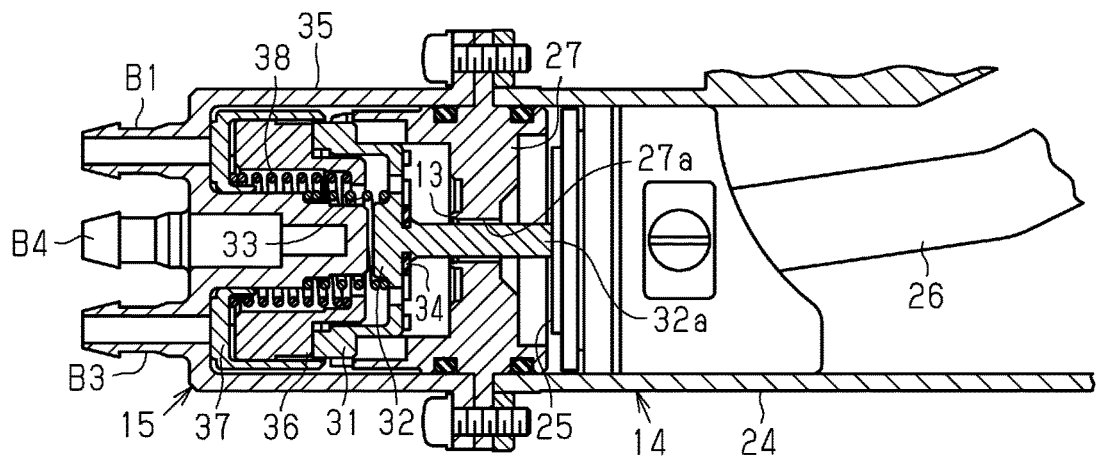
FIG. 6 is a partial cross-sectional view of the electric pump device shown in FIG. 3.

As shown in FIGS. 4 to 6, the cylinder 24 has an end opening to which a cylinder end 27 is fixed. A through hole 27a extends through a central portion of the cylinder end 27. The cylinder outer side end of the through hole 27a defines the discharge port 13. A valve member 32 is formed integrally with a linear movement member 31, which will be described later, and is arranged so that the valve member 32 is urged toward the discharge port 13 by a compression coil spring 33, which corresponds to an urging member and will be described later, and so that a shaft 32a extending from the valve member 32 extends through the through hole 27a (so that distal side projects into the cylinder 24). A rubber seal 34 is attached to a side of the valve member 32 opposed to the discharge port 13 so that the rubber seal 34 is fitted onto the shaft 32a.

Thus, in the pump 14, when the piston 25 is moved forward, the shaft 32a is urged by the piston 25 and the valve member 32 opens against urging force of the compression coil spring 33. Compressed air is discharged from the discharge port 13.

As shown in FIGS. 4 to 7, the flow passage switch 15 includes a tubular case 35 having an end wall and fixed to the outer edge of the cylinder end 27 of the pump 14; the linear movement member 31, a linear movement rotation member 36 and a rotation switch member 37, which are accommodated in the case 35; and compression coil springs 33 and 38 having different diameters. In the present embodiment, the linear movement rotation member 36 and the rotation switch member 37 configure a rotation member. In the present embodiment, a portion of the cylinder end 27 configures a portion of the flow passage switch 15.

Figure 7:
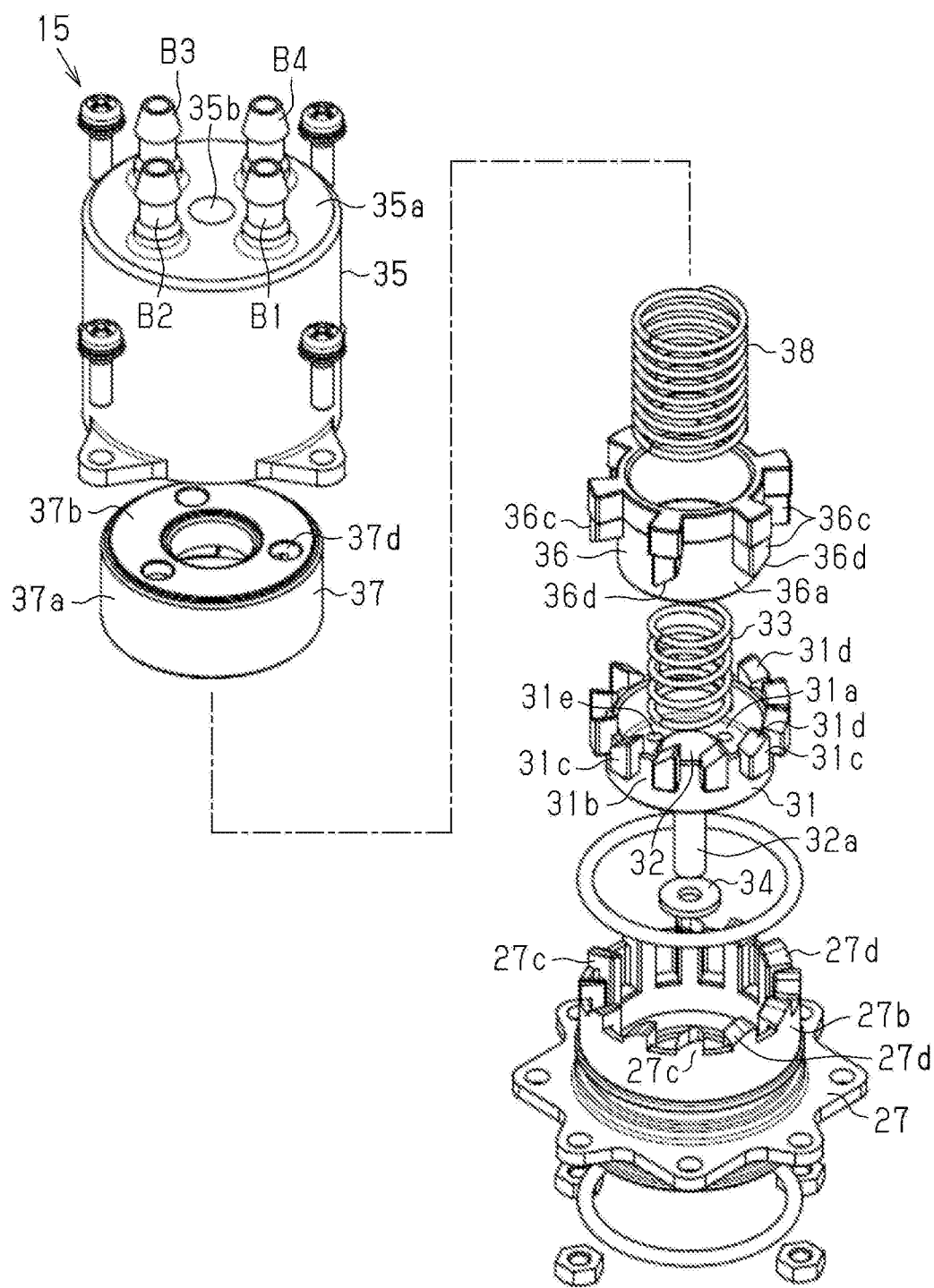
FIG. 7 is an exploded perspective view of a flow passage switch shown in FIG. 1.

More specifically, as shown in FIG. 7, the cylinder end 27 includes a tube 27b fitted into a basal side of the case 35 and multiple fixing projections 27c projecting radially inward from a distal side of the tube 27b and extending in the axial direction. The fixing projections 27c are arranged in the circumferential direction. In the present embodiment, twelve fixing projections 27c are arranged in the circumferential direction at equiangular (30°) intervals. Each of the fixing projections 27c has a distal surface inclined in the circumferential direction (more specifically, as viewed from distal side, the height in the axial direction is reduced at positions toward a clockwise direction side) defining an inclined surface 27d.

The case 35 includes a bottom portion 35a, which is an end opposite to the cylinder end 27. The bottom portion 35a includes the first to fourth outlets B1 to B4 (refer to FIG. 7) arranged at equiangular (90°) intervals. As shown in FIGS. 4 to 6, a cylindrical large diameter tube 35b extends from a central part of the bottom portion 35a toward the cylinder end 27. A cylindrical small diameter tube 35c, which has a reduced diameter and an end wall, extends from the distal end of the large diameter tube 35b further toward the cylinder end 27.

As shown in FIG. 7, the linear movement member 31 includes a disk 31a extending radially outward from the outer edge of the valve member 32, a tube 31b extending from the outer edge of the disk 31a in the axial direction, and multiple linear movement projections 31c projecting radially outward from the distal side of the tube 31b and extending in the axial direction. The linear movement projections 31c are arranged in the circumferential direction. In the present embodiment, twelve linear movement projections 31c are arranged in the circumferential direction at equiangular (30°) intervals. The linear movement projections 31c are located between the fixing projections 27c in the circumferential direction so that the linear movement projections 31c are immovable in the circumferential direction and are movable in the axial direction relative to the fixing projections 27c. Thus, only linear actuation of the linear movement member 31 is allowed. Each of the linear movement projections 31c has a distal surface inclined in the circumferential direction (more specifically, as viewed from distal side, the height in the axial direction is reduced at positions toward a clockwise direction side) defining an inclined surface 31d. The disk 31a includes multiple vent holes 31e through which air passes. As shown in FIG. 4, the compression coil spring 33, which has one end fitted onto the small diameter tube 35c and is supported by the step with the large diameter tube 35b, urges the linear movement member 31 together with the valve member 32 toward the cylinder end 27 (discharge port 13).

The linear movement rotation member 36 includes a tube 36a having a smaller diameter than the tube 31b of the linear movement member 31, an inner extension 36b (refer to FIG. 4) extending radially inward from a basal side of the tube 36a (portion toward the discharge port 13), and multiple linear movement rotation projections 36c projecting radially outward from a distal side of the tube 36a and arranged in the circumferential direction. In the present embodiment, six linear movement rotation projections 36c are arranged in the circumferential direction at equiangular (60°) intervals. Each of the linear movement rotation projections 36c has a basal surface inclined in the circumferential direction (more specifically, inclined along the inclined surface 27d of the fixing projection 27c and the inclined surface 31d of the linear movement projection 31c) defining an inclined surface 36d. The linear movement rotation member 36 is arranged so that a basal portion of the tube 36a is accommodated in the tube 31b of the linear movement member 31 and so that the linear movement rotation projections 36c are contactable with the inclined surfaces 27d of the fixing projections 27c and the inclined surfaces 31d of the linear movement projections 31c in the axial direction. When the linear movement rotation member 36 is located at the side of the discharge port 13, the linear movement rotation projections 36c are configured to be located between the fixing projections 27c in the circumferential direction. In this state, only linear actuation of the linear movement rotation member 36 is allowed. When the linear movement rotation member 36 is located at a side opposite to the discharge port 13, rotary actuation of the linear movement rotation member 36 is also allowed.

The rotation switch member 37 includes a receptacle 37a, which is configured to accommodate a distal portion of the linear movement rotation member 36, and a disk 37b, which extends radially inward from a distal portion of the receptacle 37a and is opposed to the bottom portion 35a of the case 35. The receptacle 37a has an inner surface on which multiple (six) engagement projections 37c (refer to FIG. 4) are arranged in the circumferential direction to engage with the linear movement rotation projections 36c in the circumferential direction. The rotation switch member 37 is rotatable integrally with (non-rotatable relative to) the linear movement rotation member 36 and movable with the linear movement rotation member 36 in a linear actuation direction. The compression coil spring 38 is in a compressed state and located between the disk 37b of the rotation switch member 37 and the inner extension 36b of the linear movement rotation member 36 in the axial direction. Thus, the rotation switch member 37 (disk 37b) is in press contact with the bottom portion 35a of the case 35, and the linear movement rotation member 36 is urged toward the discharge port 13. The disk 37b includes communication holes 37d. The rotation switch member 37 closes (allows communication of) at least one of the first to fourth outlets B1 to B4 to switch the outlets B1 to B4 that are in communication with the discharge port 13 in accordance with the rotation position.

Figure 14:
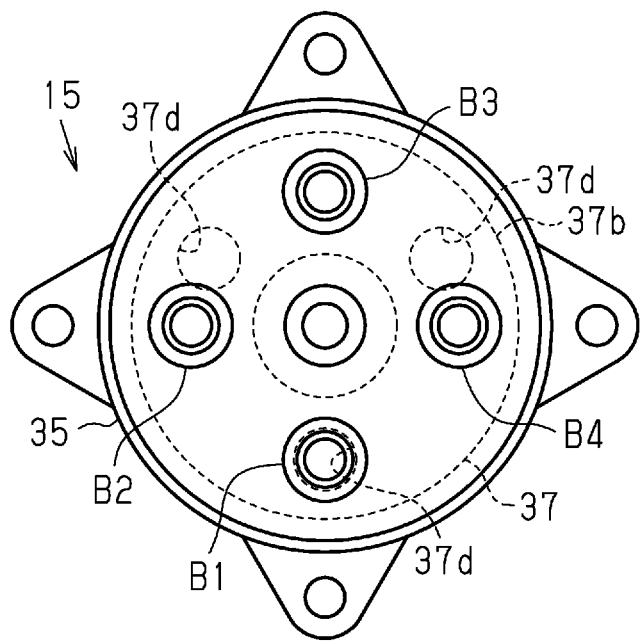
FIG. 14 is a plan view of the flow passage switch shown in FIG. 7.

More specifically, as shown in FIGS. 7 and 14, in the present embodiment, three communication holes 37d are arranged at equiangular (120°) intervals and configured so that with each 30° rotation, a different one of the outlets B1 to B4 is sequentially in communication with the discharge port 13 via one of the communication holes 37d. More specifically, in the state shown in FIG. 14, one of the communication holes 37d is located at a position conforming to the first outlet B1. The first outlet B1 is in communication with the discharge port 13 (refer to FIG. 4) via the communication hole 37d. The remaining second to fourth outlets B2 to B4 are closed by the disk 37b and are not in communication with the discharge port 13. For example, when the rotation switch member 37 is rotated 30° in the counterclockwise direction from the state shown in FIG. 14, the (upper left in FIG. 14) communication hole 37d is located at a position conforming to the second outlet B2. The second outlet B2 is in communication with the discharge port 13 via the communication hole 37d. When the rotation switch member 37 is further rotated 30° in the counterclockwise direction from this state, the (upper right in FIG. 14) communication hole 37d is located at a position conforming to the third outlet B3. The third outlet B3 is in communication with the discharge port 13 via the communication hole 37d. When the rotation switch member 37 is further rotated 30° in the counterclockwise direction from this state, the (lower in FIG. 14) communication hole 37d is located at a position conforming to the fourth outlet B4. The fourth outlet B4 is in communication with the discharge port 13 via the communication hole 37d. When the rotation switch member 37 is further rotated 30° in the counterclockwise direction from this state, the (upper left in FIG. 14) communication hole 37d is located at a position conforming to the first outlet B1. The first outlet B1 is in communication with the discharge port 13 via the communication hole 37d. Such a repetition allows the outlets B1 to B4 to be sequentially in communication with the discharge port 13 via the communication holes 37d. In the present embodiment, the inclination direction of the inclined surfaces 27d, 31d, and 36d is illustrated in the reverse direction and does not correspond to the rotation direction of the rotation switch member 37 described above.

The operation of the above-described on-board sensor cleaning device will now be described.

Figure 8:
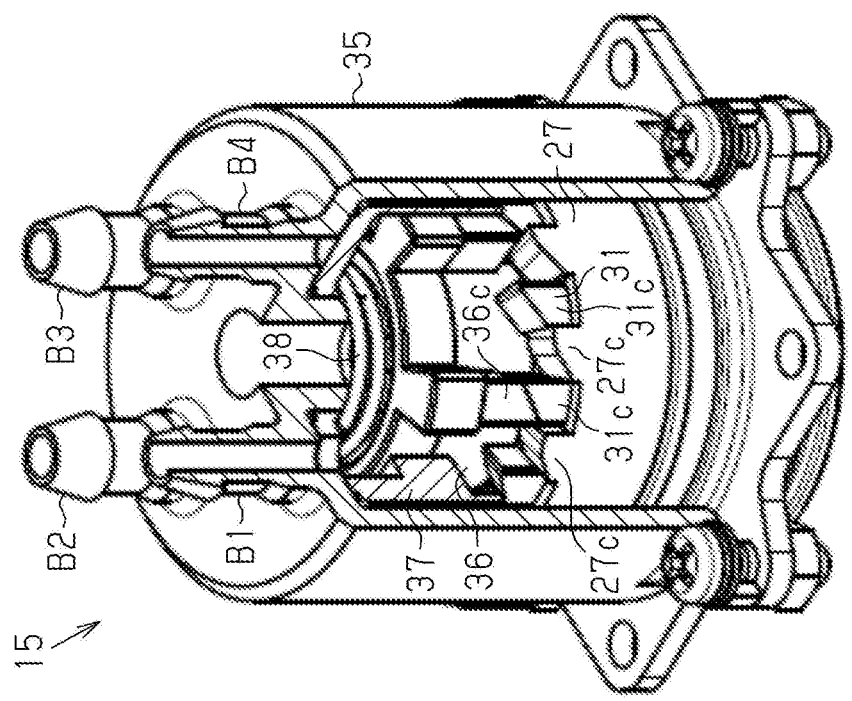
FIG. 8 is a partial cross-sectional perspective view of the flow passage switch shown in FIG. 7.

As shown in FIGS. 4 and 8, when the piston 25 is located at the bottom dead position (position farthest from the cylinder end 27), the linear movement member 31 is located at the side of the cylinder end 27, and the discharge port 13 is closed by the valve member 32. In this state, the linear movement projections 31c of the linear movement member 31 are embedded between the fixing projections 27c, and the linear movement rotation projections 36c of the linear movement rotation member 36 are fitted between the fixing projections 27c. Thus, circumferential movement (rotation) of the linear movement rotation member 36 and the rotation switch member 37 is restricted.

As shown in FIG. 5, when the motor 12 is driven to move the piston 25 forward, the air in the cylinder 24 is compressed until the piston 25 comes into contact with the shaft 32a of the linear movement member 31.

When the piston 25 is further moved forward, the piston 25 urges the shaft 32a. When the linear movement member 31 including the valve member 32 is slightly actuated linearly toward the distal side (toward the bottom portion 35a of the case 35) against urging force of the compression coil spring 33, the valve member 32 opens to discharge the compressed air from the discharge port 13. At this time, the air is ejected from, for example, the first outlet B1 located at a position conforming to the communication hole 37d and in communication with the discharge port 13. The air is fed to the first inlet A1 through the hose H (refer to FIG. 1) and ejected from the first nozzle port N1 (refer to FIG. 2) toward the cover glass 4. At this time, the linear movement rotation projections 36c are urged by the linear movement projections 31c, so that the linear movement rotation member 36 is also slightly actuated linearly toward the distal side (toward the bottom portion 35a of the case 35) against urging force of the compression coil spring 38.

Figure 9:
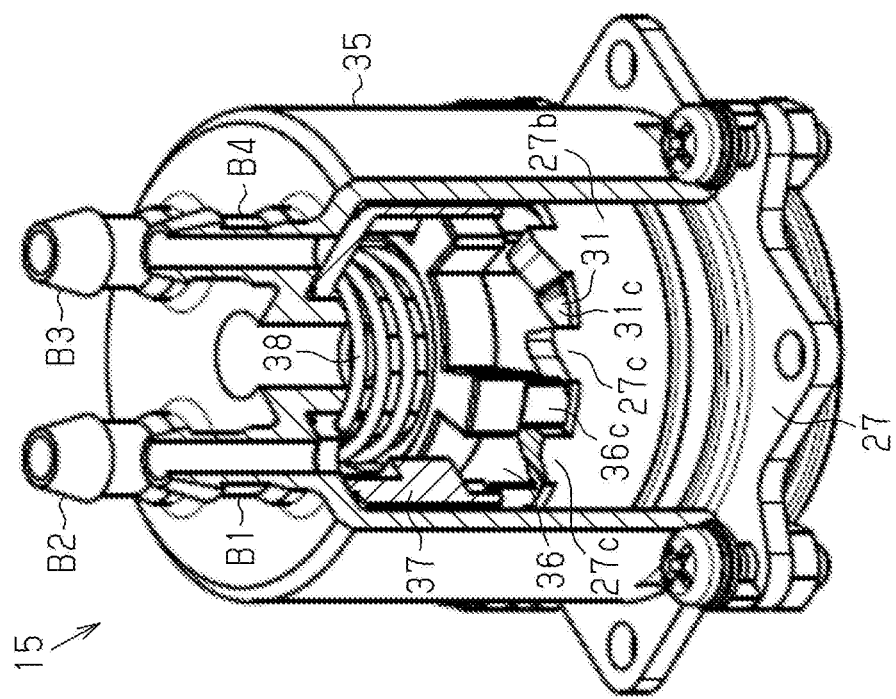
FIG. 9 is a partial cross-sectional perspective view of the flow passage switch shown in FIG. 7.

As shown in FIG. 9, when forward movement of the piston 25 linearly actuates the linear movement member 31 (linear movement projections 31c) further toward the distal side, the linear movement rotation member 36 is also linearly actuated toward the distal side (toward the bottom portion 35a of the case 35) to a predetermined position where the linear movement rotation projections 36c become out of contact with the fixing projections 27c in the circumferential direction.

Figure 10:
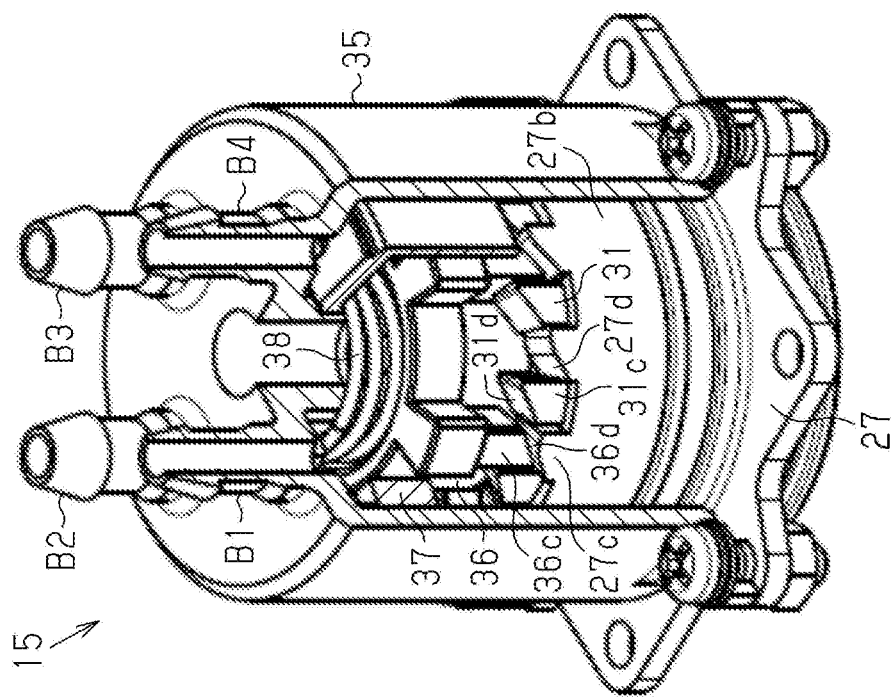
FIG. 10 is a partial cross-sectional perspective view of the flow passage switch shown in FIG. 7.

As shown in FIGS. 6 and 10, when forward movement of the piston 25 linearly actuates the linear movement member 31 (linear movement projections 31c) further toward the distal side, the linear movement rotation projections 36c moves beyond the predetermined position and becomes out of contact with the fixing projections 27c in the circumferential direction. The inclined surfaces 31d and 36d convert the linear actuation into rotary actuation, and the linear movement rotation member 36 and the rotation switch member 37 are rotated.

Figure 11:
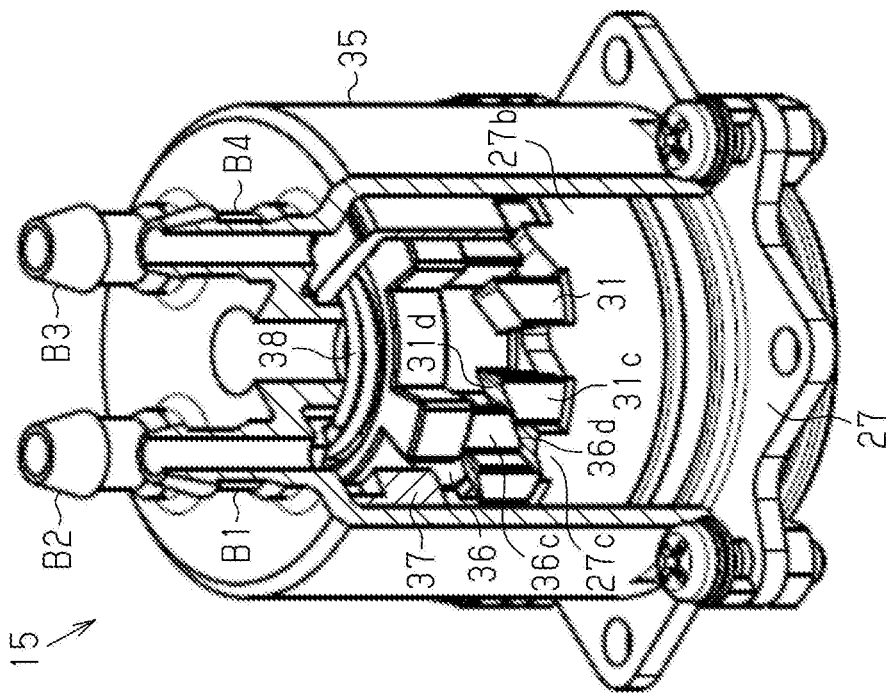
FIG. 11 is a partial cross-sectional perspective view of the flow passage switch shown in FIG. 7.

Consequently, as shown in FIG. 11, the fixing projections 27c of the linear movement rotation member 36 and the linear movement rotation projections 36c are aligned in the axial direction (circumferential positions conform to each other).

Figure 12:
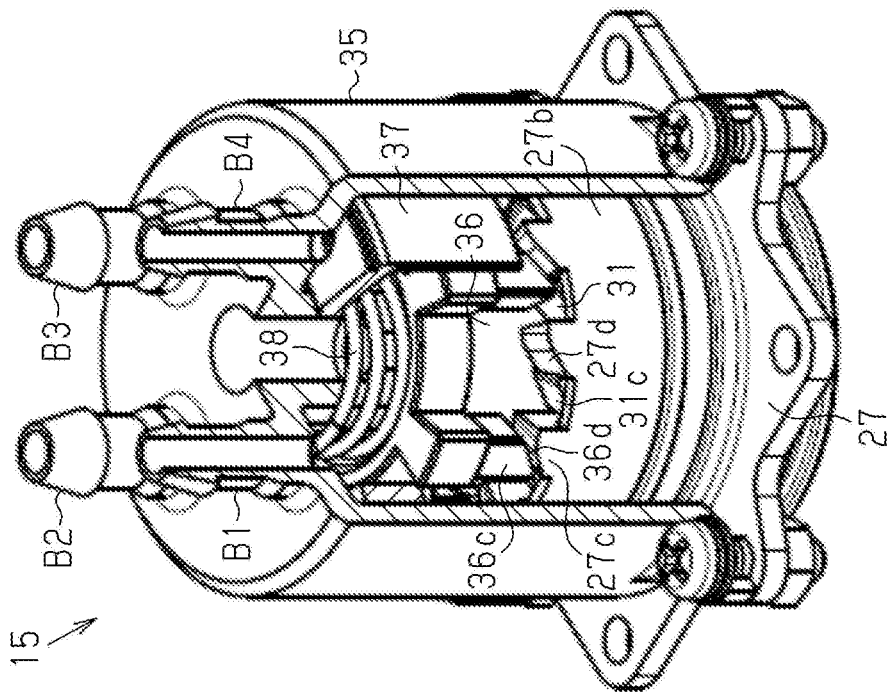
FIG. 12 is a partial cross-sectional perspective view of the flow passage switch shown in FIG. 7.

As shown in FIG. 12, when the piston 25 is moved backward and the linear movement projections 31c of the linear movement member 31 are embedded between the fixing projections 27c, the inclined surfaces 27d and 36d convert linear actuation caused by the compression coil spring 38 into rotary actuation. The linear movement rotation member 36 and the rotation switch member 37 are further rotated.

Figure 13:
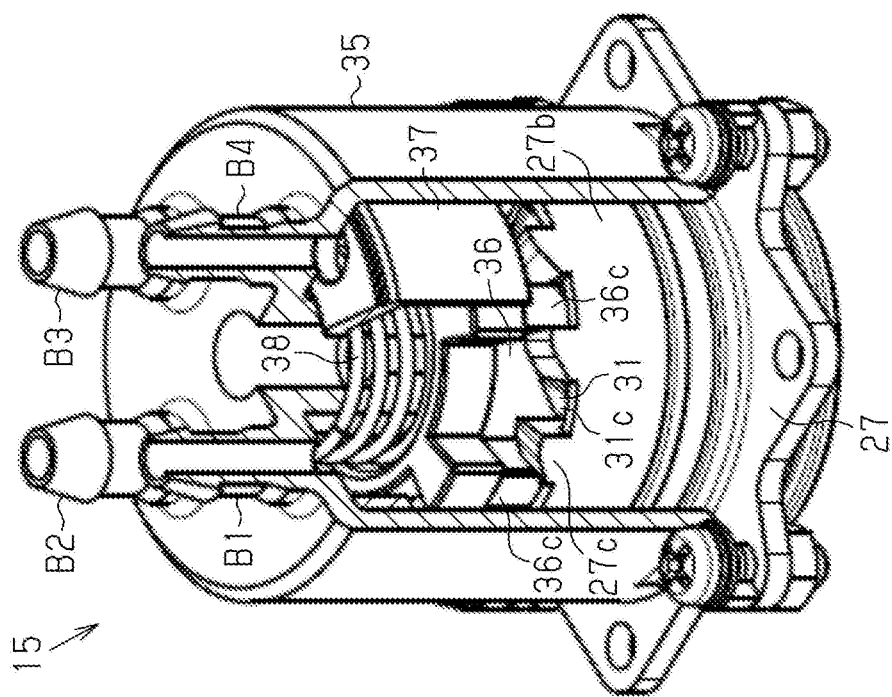
FIG. 13 is a partial cross-sectional perspective view of the flow passage switch shown in FIG. 7.

As shown in FIG. 13, the linear movement rotation projections 36c of the linear movement rotation member 36 are fitted between the fixing projections 27c located next to the initial ones (refer to FIG. 8). Thus, circumferential movement (rotation) of the linear movement rotation member 36 and the rotation switch member 37 is restricted. At this time, for example, one of the communication holes 37d is located at a position conforming to the second outlet B2. When the valve opens next time, the air is ejected from the second outlet B2, which is in communication with the discharge port 13.

Repetition of such actuations sequentially ejects the air from the first to fourth nozzle ports N1 to N4 in a predetermined order. In the present embodiment, the predetermined order refers to an order that repeats a pattern in which the nozzle ports N1 to N4 are selected one at a time and each of the nozzle ports N1 to N4 is selected once. The pattern proceeds one by one from a side of one end (in FIG. 2, right side, first nozzle port N1) toward a side of the other end (in FIG. 2, left side, fourth nozzle port N4) in the arrangement direction.

The first embodiment has the advantages described below.

(1) The electric pump device 11 includes the pump 14 that discharges fluid (air) from the discharge port 13 with driving force of the motor 12 and the flow passage switch 15 that includes the first to fourth outlets B1 to B4 configured to be in communication with the discharge port 13 and switches the outlets B1 to B4 that are in communication with the discharge port 13 with driving force of the motor 12. Thus, while the fluid is discharged from the discharge port 13 of the pump 14 with driving force of the single motor 12, the flow passage switch 15 switches the outlets B1 to B4 that are in communication with the discharge port 13 in accordance with driving force of the same motor 12. The configuration including the single motor 12 allows the fluid (air) to be sequentially fed from the outlets B1 to B4. For example, as described in the present embodiment, the air is sequentially ejected from the nozzle ports N1 to N4. More specifically, this configuration reduces the number of electric pump devices 11 as compared to, for example, a configuration in which an electric pump device (motor and pump) is provided for each of the nozzle ports N1 to N4 and reduces the size of the electric pump device 11 as compared to a configuration that divides air. Thus, while reducing the size, the fluid (air) is fed to multiple locations in a satisfactory manner.

(2) When the linear movement member is linearly actuated by driving force of the motor, the linear movement rotation member is urged by the linear actuation of the linear movement member and linearly moved together with the linear movement member to the predetermined position. The linear movement rotation member is rotated in the circumferential direction beyond the predetermined position. When the linear movement rotation member is rotated, the rotation switch member is integrally rotated to close at least one of the outlets so that the outlet that is in communication with the discharge port is switched in accordance with the rotation position. More specifically, the fluid is sequentially fed from the multiple outlets.

(3) The inclined surface, which is arranged on at least one of the linear movement member and the rotation member and inclined in the circumferential direction, converts linear actuation of the linear movement member into rotary actuation of the rotary member. This switches the outlet that is in communication with the discharge port. More specifically, the fluid is sequentially fed from the multiple outlets.

(4) The linear movement member 31 is urged and actuated in one direction by driving force of the motor 12 and in the other direction by urging force of the compression coil spring 33. In such a configuration, driving force of the motor 12 needs to be transmitted in only one direction. This simplifies the configuration that drivingly couples the motor 12 to the linear movement member 31. More specifically, as in the present embodiment, the configuration may be simplified so that the linear movement member 31 needs to be urged only when moving the piston 25 forward.

(5) The linear movement member 31 is urged and actuated by the piston 25 of the pump 14. Thus, the piston 25 of the pump 14 also functions as a mechanism (mechanism that discharges air) that urges the linear movement member 31 in one direction. This simplifies the configuration as compared to, for example, a configuration having a separate mechanism that urges the linear movement member 31.

(6) Feeding of fluid from the discharge port 13 of the pump 14 to the outlets B1 to B4 is set to be completed in a state before the linear movement rotation member 36 and the rotation switch member 37 are rotated in the circumferential direction by linear actuation of the linear movement member 31. Thus, feeding of air from the outlets B1 to B4 is completed before the outlets B1 to B4 that are in communication with the discharge port 13 are switched. More specifically, the air will not be ejected while switching the outlets B1 to B4.

(7) The first to fourth nozzle ports N1 to N4 are configured to eject air in a predetermined order to clean the cover glass 4 of the on-board camera 3. This allows for reduction in size while using the single electric pump device 11 feeding air to the nozzle ports N1 to N4.

(8) The predetermined order refers to an order that repeats a pattern in which the nozzle ports N1 to N4 are selected one at a time and each of the nozzle ports N1 to N4 is selected once. Thus, the cover glass 4 is evenly cleaned with air sequentially ejected from the nozzle ports N1 to N4. The pattern proceeds one by one from a side of one end toward a side of the other end in the arrangement direction of the first to fourth nozzle ports N1 to N4. Thus, the cover glass 4 is evenly cleaned from the side of one end toward the side of the other end in the arrangement direction in a sequential manner.

(9) The first to fourth nozzle ports N1 to N4 are open toward the single cover glass 4. The ejection axes F1 to F4 of air ejected from the nozzle ports N1 to N4 are set to directions that are non-coaxial with each other. Thus, a wide range of the cover glass 4 is cleaned in a satisfactory manner.

(10) Since the first to fourth nozzle ports N1 to N4 are located at an antigravitational side of the cover glass 4, the air is ejected in the gravitational direction. Thus, the cover glass 4 is cleaned in a satisfactory manner as compared to a case in which air is ejected against gravity.

The first embodiment may be modified as follows.

In the embodiment, the nozzle ports N1 to N4 are set so that the ejection axes F1 to F4 extend in the gravitational direction as viewed from the front of the cover glass 4. Instead, the nozzle ports N1 to N4 may be set so that the ejection axes F1 to F4 are inclined from the gravitational direction as viewed from the front of the cover glass 4.

Figure 15:
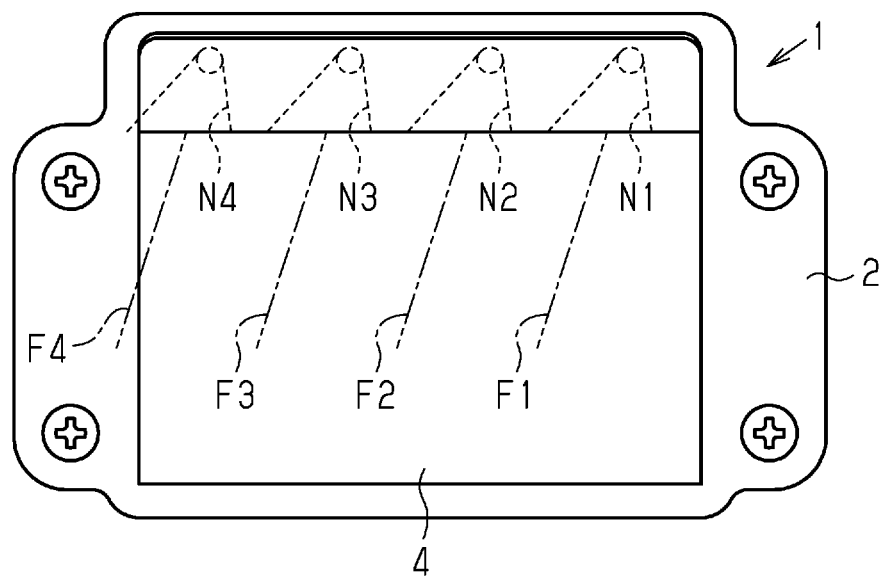
FIG. 15 is a front view showing a further example of a camera unit.

For example, as shown in FIG. 15, the nozzle ports N1 to N4 may be changed so that the ejection axes F1 to F4 are inclined toward the other end in the arrangement direction (in FIG. 15, sideward direction). With such a configuration, smearing on the cover glass 4 is sequentially moved toward the other end in the arrangement direction, and the cover glass 4 is cleaned in a satisfactory manner.

In the embodiment, the first to fourth nozzle ports N1 to N4 are located at the antigravitational side of the cover glass 4. Instead, the first to fourth nozzle ports N1 to N4 may be located at the gravitational side of the cover glass 4 so that the ejection axes extend in the antigravitational direction.

The embodiment is configured to include the first to fourth nozzle ports N1 to N4 (outlets B1 to B4). Instead, the number of nozzle ports may be changed to any plural number.

Figure 16:
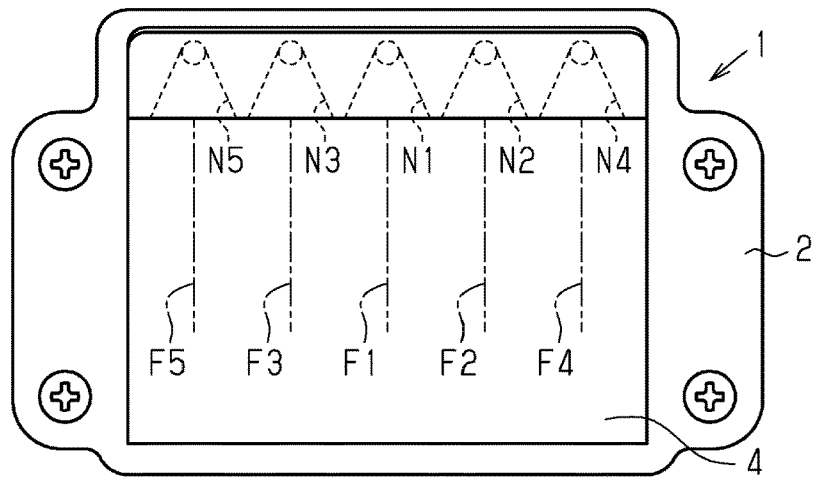
FIG. 16 is a front view showing a further example of a camera unit.

For example, as shown in FIG. 16, the configuration may include first to fifth nozzle ports N1 to N5. In this example, the pattern of the order of air ejection starts from a central position in the arrangement direction of the nozzle ports N1 to N5 and alternately switches between the side of one end and the side of the other end in the arrangement direction to proceed toward the ends in the arrangement direction. With such a configuration, the cover glass 4 is evenly cleaned from the central position toward the opposite ends in the arrangement direction in a sequential manner.

Figure 17:
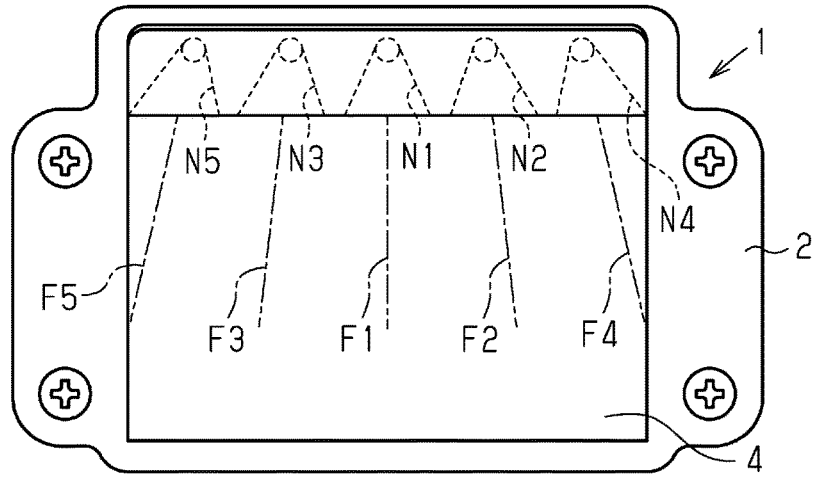
FIG. 17 is a front view showing a further example of a camera unit.

The setting of the ejection axes F1 to F5 of the first to fifth nozzles N1 to N5 in the above further example (refer to FIG. 16) may be changed as shown in FIG. 17. More specifically, in this example (refer to FIG. 17), the ejection axis F1 of the first nozzle port N1 located in the central position in the arrangement direction is not inclined in the arrangement direction. The ejection axes F2 and F4 of the second and fourth nozzle ports N2 and N4, which are located at the side of one end in the arrangement direction, are inclined toward the one end in the arrangement direction. The ejection axes F3 and F5 of the third and fifth nozzle ports N3 and N5, which are located at the side of the other end in the arrangement direction, are inclined toward the other end in the arrangement direction. With such a configuration, smearing on the cover glass 4 is sequentially moved from the central position toward the opposite ends in the arrangement direction, and the cover glass 4 is cleaned in a satisfactory manner.

Figure 18:
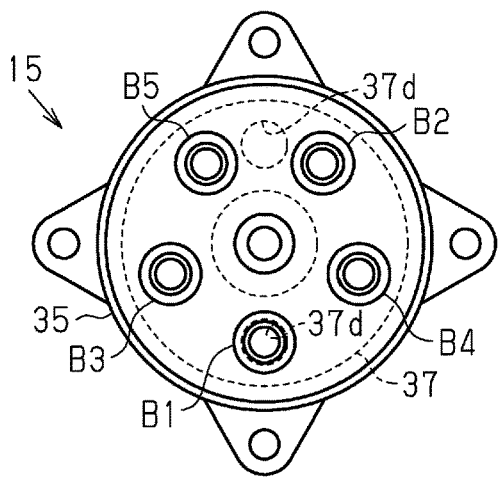
FIG. 18 is a plan view showing a further example of a flow passage switch.

When the five nozzle ports N1 to N5 are included as in the further examples (refer to FIGS. 16 and 17), the flow passage switch 15 needs to include first to fifth outlets B1 to B5 as shown in FIG. 18. More specifically, in this example (refer to FIG. 18), the flow passage switch 15 includes first to fifth outlets B1 to B5 at equiangular (72°) intervals. Two communication holes 37*d* are formed in the rotation switch member 37 at equiangular (180°) intervals and configured so that whenever the rotation switch member 37 is rotated 36°, a different one of the outlets B1 to B5 is sequentially in communication with one of the communication holes 37*d*. FIG. 18 shows a state in which the first outlet B1 is in communication with the communication hole 37*d*. Whenever the rotation switch member 37 is rotated 36° in the clockwise direction from the present state, the second to fifth outlets B2 to B5 are sequentially in communication with the communication holes 37*d*.

The number of outlets (nozzle ports) and the pattern of the order of air ejection may be changed, for example, as shown in FIGS. 19A to 19F.

Figure 19A:
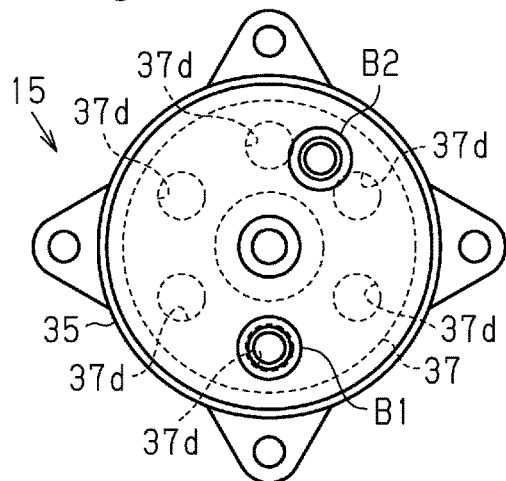
FIGS. 19A to 19F are plan views showing further examples of a flow passage switch.

More specifically, as shown in FIG. 19A, the flow passage switch 15 may include first and second outlets B1 and B2 separated from each other by 150°, and six communication holes 37*d* may be formed in the rotation switch member 37 at equiangular (60°) intervals so that whenever the rotation switch member 37 is rotated 30°, a different one of the outlets B1 and B2 is sequentially in communication with one of the communication holes 37*d*.

Figure 19B:
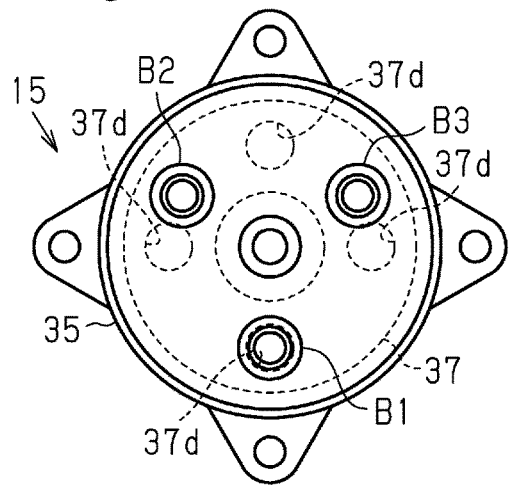

As shown in FIG. 19B, the flow passage switch 15 may include first to third outlets B1 to B3 at equiangular (120°) intervals, and four communication holes 37*d* may be formed in the rotation switch member 37 at equiangular (90°) intervals so that whenever the rotation switch member 37 is rotated 30°, a different one of the outlets B1 to B3 is sequentially in communication with one of the communication holes 37*d*.

Figure 19C:
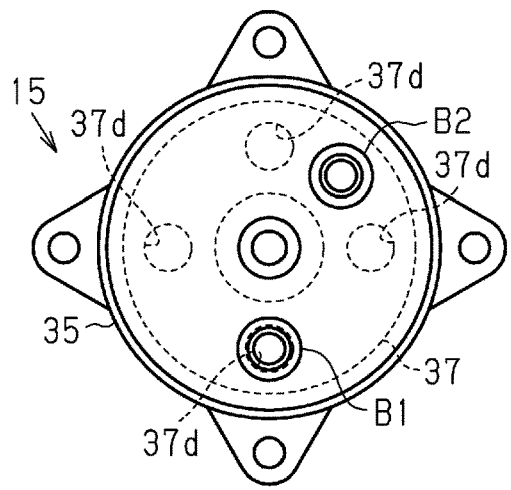

As shown in FIG. 19C, the flow passage switch 15 may include first and second outlets B1 and B2 separated from each other by 135°, and four communication holes 37*d* may be formed in the rotation switch member 37 at equiangular (90°) intervals so that whenever the rotation switch member 37 is rotated 45°, a different one of the outlets B1 and B2 is sequentially in communication with one of the communication holes 37*d*.

Figure 19D:
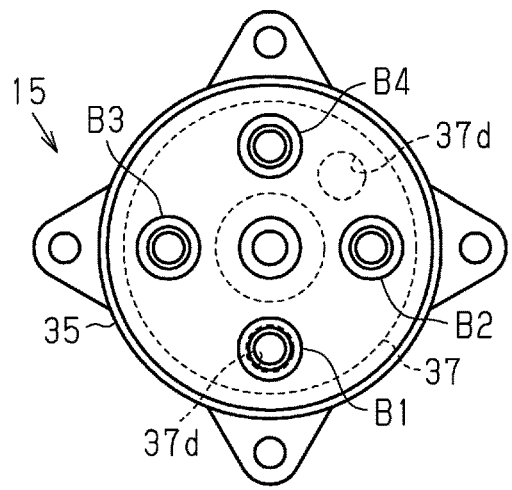

As shown in FIG. 19D, the flow passage switch 15 may include first to fourth outlets B1 to B4 at equiangular (90°) intervals, and two communication holes 37*d* separated from each other by 135° may be formed in the rotation switch member 37 so that whenever the rotation switch member 37 is rotated 45°, a different one of the outlets B1 to B4 is sequentially in communication with one of the communication holes 37*d*. This example does not repeat a pattern in which each of the outlets B1 to B4 (nozzle ports) that are in communication with the communication holes 37*d* is selected once. More specifically, as the rotation switch member 37 is rotated 45° in the clockwise direction from the state shown in FIG. 19D, communication with the communication holes 37d is established in order of the first outlet B1, the second outlet B2, the third outlet B3, the first outlet B1, the fourth outlet B4, the third outlet B3, the second outlet B2, the fourth outlet B4, and so on.

Figure 19E:
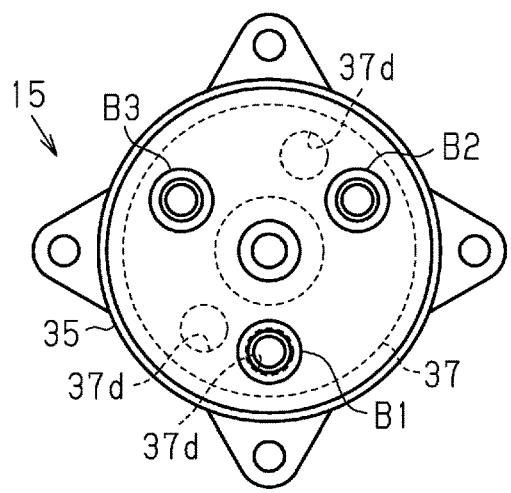

As shown in FIG. 19E, the flow passage switch 15 may include first to third outlets B1 to B3 located at equiangular (120°) intervals, and the rotation switch member 37 may include three communication holes 37d, namely, a reference communication hole 37d, a communication hole 37d separated by 40° from the reference communication hole 37d in the clockwise direction, and a communication hole 37d separated by 160° from the reference communication hole 37d in the counterclockwise direction. Whenever the rotation switch member 37 is rotated 40°, a different one of the outlets B1 to B3 is sequentially in communication with one of the communication holes 37d. This example does not repeat a pattern in which each of the outlets B1 to B3 (nozzle ports) that are in communication with the communication holes 37d is selected once. More specifically, as the rotation switch member 37 is rotated 40° in the clockwise direction from the state shown in FIG. 19E, communication with the communication holes 37d is established in order of the first outlet B1, the second outlet B2, the third outlet B3, the third outlet B3, the first outlet B1, the second outlet B2, the second outlet B2, the third outlet B3, the first outlet B1, and so on.

Figure 19F:
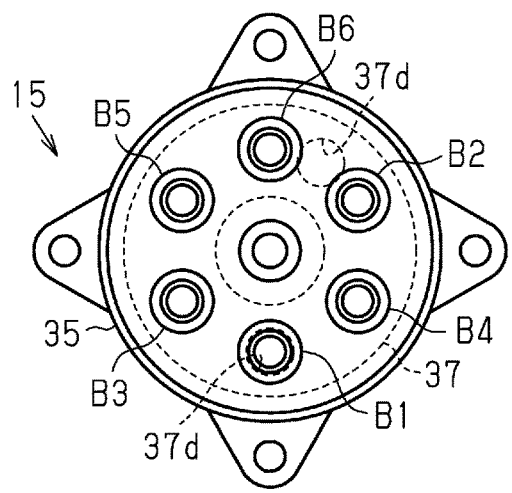

As shown in FIG. 19F, the flow passage switch 15 may include first to sixth outlets B1 to B6 at equiangular (60°) intervals, and two communication holes 37d separated from each other by 150° may be formed in the rotation switch member 37 so that whenever the rotation switch member 37 is rotated by 30°, a different one of the outlets B1 to B6 is sequentially in communication with one of the communication holes 37d. This example does not repeat a pattern in which each of the outlets B1 to B6 (nozzle ports) that are in communication with the communication holes 37d is selected once. More specifically, as the rotation switch member 37 is rotated 30° in the clockwise direction from the state shown in FIG. 19F, communication with the communication holes 37d is established in order of the first outlet B1, the second outlet B2, the third outlet B3, the fourth outlet B4, the fifth outlet B5, the first outlet B1, the sixth outlet B6, the third outlet B3, the second outlet B2, the fifth outlet B5, the fourth outlet B4, the sixth outlet B6, and so on.

In the embodiment, the electric pump device 11 is configured so that the motor 12, the pump 14, and the flow passage switch 15 are arranged integrally with each other. Instead, the motor 12, the pump 14, and the flow passage switch 15 may be configured not to be integrally arranged (may be arranged in different casings).

Figure 20:
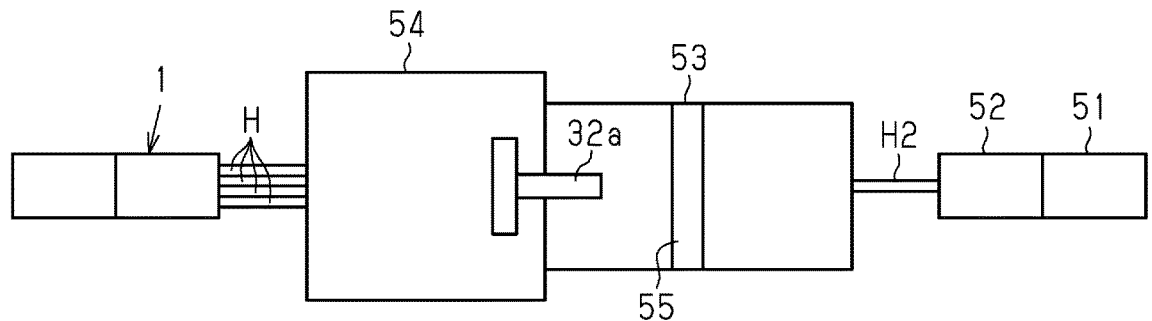
FIG. 20 is a schematic view showing the configuration of a further example of an on-board sensor cleaning device.

For example, as shown in FIG. 20, when a motor 51 and a first pump 52 are arranged integrally with each other and a second pump 53 and a flow passage switch 54 are arranged integrally with each other, they may be connected by a hose H2. In this example, for example, the first pump 52 is a centrifugal pump, and the second pump 53 is of a cylinder type and includes a piston 55 driven by air from the first pump 52.

The configuration of the flow passage switch 15 of the embodiment may be changed to another configuration that includes multiple outlets configured to be in communication with a discharge port of a pump and switches the outlet that is in communication with the discharge port with driving force of a motor that drives the pump.

In the embodiment, the linear movement member 31 is configured to be urged and actuated by driving force of the motor 12 in one direction and urged and actuated by urging force of the compression coil spring 33 in the other direction. Instead, for example, the linear movement member 31 may be configured to be actuated by driving force of a motor in one direction and the other direction.

In the embodiment, the linear movement member 31 is configured to be urged and actuated by the piston 25 of the pump 14. Instead, for example, the configuration may include a separate mechanism that urges the linear movement member 31 with driving force of the motor 12.

In the embodiment, the first to fourth nozzle ports N1 to N4 are configured to eject air toward the single cover glass 4. Instead, the first to fourth nozzle ports N1 to N4 may eject air toward multiple sensing surfaces (e.g., cover glass, lens). The on-board sensor cleaning device may be configured to perform cleaning by ejecting fluid such as cleaning liquid instead of air.

Figure 21:
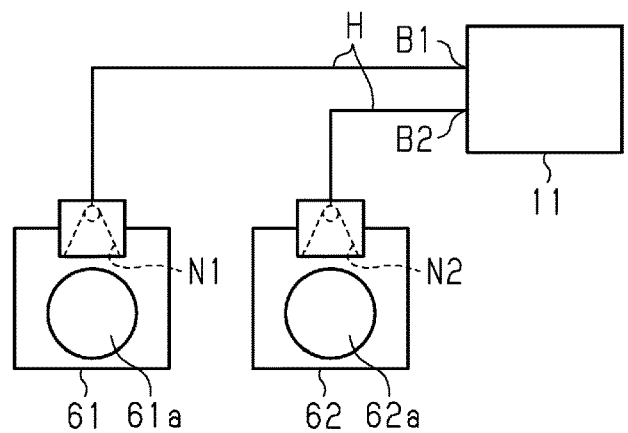
FIG. 21 is a schematic view showing a further example of an on-board sensor cleaning device.

For example, a modification may be configured as shown in FIG. 21. More specifically, the electric pump device 11 may include first and second outlets B1 and B2 (refer to FIG. 19C). The first and second nozzle ports N1 and N2, which are in communication with the first and second outlets B1 and B2, may eject air toward lenses 61a and 62a, which correspond to sensing surfaces of two on-board cameras 61 and 62.

Figure 22:
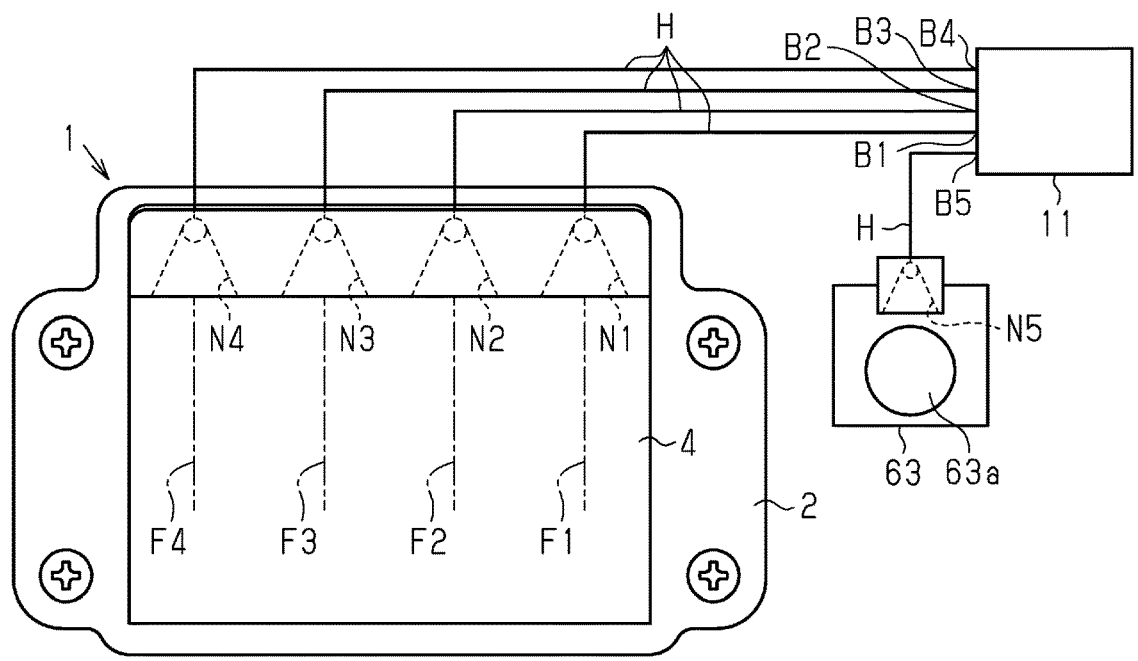
FIG. 22 is a schematic view showing a further example of an on-board sensor cleaning device.

For example, a modification may be configured as shown in FIG. 22. More specifically, the electric pump device 11 may include first to fifth outlets B1 to B5 (refer to FIG. 18). The first to fourth nozzle ports N1 to N4, which are in communication with the first to fourth outlets B1 to B4, may be the same as the embodiment (are configured to eject air toward the single cover glass 4). The fifth nozzle port N5, which is in communication with the fifth outlet B5, may eject air toward a lens 63a of a separate on-board camera 63.

In the embodiment, the outer surface of the cover glass 4 is flat. Instead, for example, the outer surface may be curved defining a curved surface.

In the embodiment, although not particularly described, ejection of air from all of the nozzle ports N1 to N4 may be defined as a cycle, and when stopping, the actuation may be continued until the cycle is completed. More specifically, for example, a controller that controls the electric pump device 11 may always eject air from the first outlet B1 when starting. When receiving a signal to stop and during subsequent stopping, the controller may drive the motor 12 until air is ejected from the forth (the last in cycle) outlet B4. Such a configuration avoids a situation in which, for example, the actuation is stopped without cleaning a portion of the sensing surface. The sensing surface corresponding to each of the nozzle ports N1 to N4 is evenly cleaned.

A second embodiment of an on-board sensor cleaning device will now be described with reference to FIGS. 1 to 3 and 23 to 29. Like or the same reference characters are given to those components that are like or the same as the corresponding components of the first embodiment, and detailed explanations are omitted.

Figure 23:
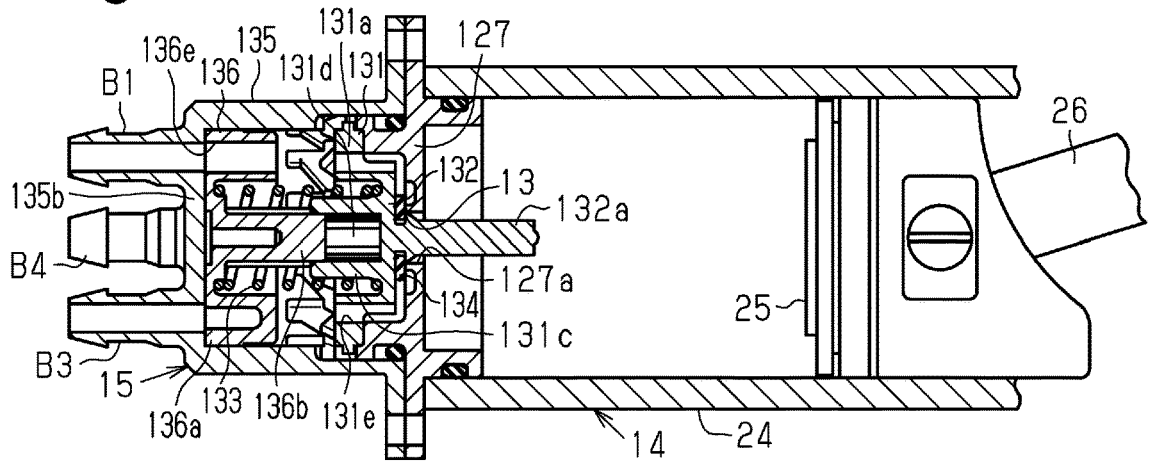
FIG. 23 is a partial cross-sectional view showing a second embodiment of an electric pump device.

As shown in FIG. 23, the cylinder 24 has an end opening to which a cylinder end 127 is fixed. A through hole 127a extends through a central portion of the cylinder end 127. The cylinder outer side end of the through hole 127a defines the discharge port 13. A valve member 132 is formed integrally with a drive member 131, which will be described later, and is arranged so that the valve member 132 is urged toward the discharge port 13 by a compression coil spring 133, which is an urging member and will be described later, and so that a shaft 132a extending from the valve member 132 extends through the through hole 127a (so that distal side projects into the cylinder 24). A rubber seal 134 is attached to a side of the valve member 132 opposed to the discharge port 13 so that the rubber seal 134 is fitted onto the shaft 132a.

Thus, in the pump 14, when the piston 25 is moved forward, the shaft 132a is urged by the piston 25 in the axial direction (linear direction) and the valve member 132 opens against urging force of the compression coil spring 133. The compressed air is discharged from the discharge port 13.

As shown in FIGS. 23 to 26, the flow passage switch 15 includes a tubular case 135 having an end wall and fixed to the outer edge of the cylinder end 127 of the pump 14, the drive member 131 and the rotation switch member 136 that are accommodated in the case 135, and the compression coil spring 133.

More specifically, as shown in FIGS. 26A and 26B, the drive member 131 includes a disk 131a extending radially outward from the outer edge of the valve member 132 and projections 131b projecting radially outward from an outer circumferential surface of the disk 131a (in other words, in a direction orthogonal to the linear direction). In the present embodiment, four projections 131b are arranged in the circumferential direction at equiangular (90°) intervals. As shown in FIGS. 23 and 26B, the drive member 131 includes an engagement tube 131c extending toward the side opposite to the shaft 132a. The inner circumferential surface of the engagement tube 131c includes a first circumferential engagement portion 131d in which recesses and ridges are repeated in the circumferential direction. Additionally, vent holes 131e extending through the disk 131a in the axial direction are arranged in positions close to the outer edge in the circumferential direction and allow air to pass through.

Figure 27:
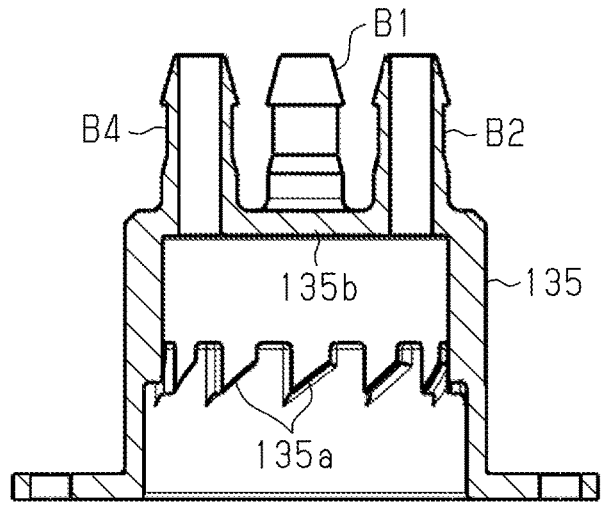
FIG. 27 is a cross-sectional view of a case and a cylinder end shown in FIG. 26.
Figure 27:
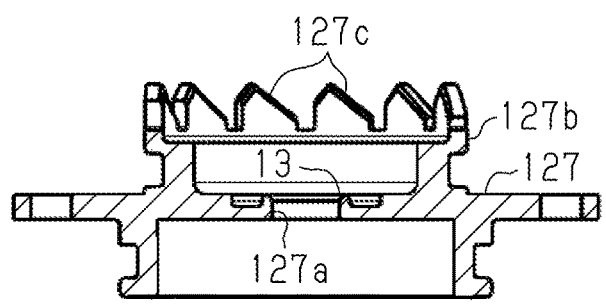

Additionally, as shown in FIGS. 26A and 27, the inner circumferential surface of the case 135 includes first inclined surfaces 135a. In a process in which the drive member 131 moves toward one side in the linear direction, the first inclined surfaces 135a come into contact with the projections 131b and guide the drive member 131 including the projections 131b in the circumferential direction.

As shown in FIGS. 26B and 27, the cylinder end 127 includes a tube 127b fitted into the basal side of the case 135, and the tube 127b has a distal side including second inclined surfaces 127c. In a process in which the drive member 131 moves toward the other side in the linear direction, the second inclined surfaces 127c come into contact with the projections 131b and guide the drive member 131 including the projections 131b in the circumferential direction. In the present embodiment, the first inclined surfaces 135a and the second inclined surfaces 127c configure a conversion engagement portion that converts linear movement of the drive member 131 into circumferential rotation.

Figure 28:
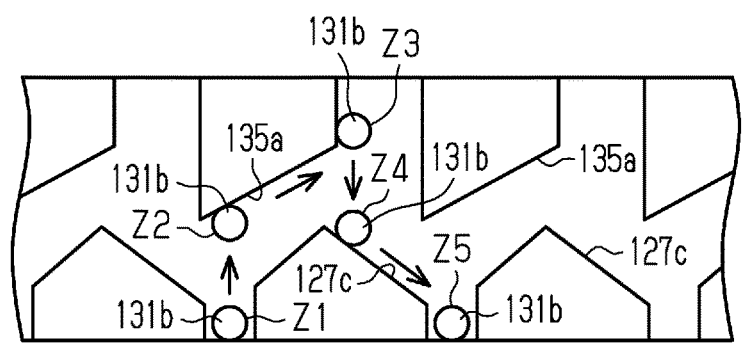
FIG. 28 is a schematic diagram showing actuation of the electric pump device shown in FIG. 23.

Thus, as shown in FIG. 28, in a process in which the drive member 131 moves toward one side (upper side in FIG. 28) in the linear direction, the projections 131b of the drive member 131 come into contact with the first inclined surfaces 135a and guide the drive member 131 including the projections 131b in the circumferential direction. In a process in which the drive member 131 moves toward the other side (lower side in FIG. 28) in the linear direction, the projections 131b come into contact with the second inclined surfaces 127c and guide the drive member 131 including the projections 131b in the circumferential direction. Thus, when the drive member 131 is driven and moved forward and backward once in the linear direction, the drive member 131 is rotated in the circumferential direction in accordance with the first inclined surfaces 135a and the second inclined surfaces 127c. FIG. 28 schematically shows movement of the projections 131b from a position Z1 to a position Z5 with arrows.

As shown in FIG. 26B, the case 135 includes a bottom portion 135b, which is an end opposite to the cylinder end 127. The first to fourth outlets B1 to B4 are arranged in the bottom portion 135b at equiangular (90°) intervals.

As shown in FIGS. 26A and 26B, the rotation switch member 136 includes a disk 136a and an engagement shaft 136b extending from a central portion of the disk 136a in the axial direction. The outer circumferential surface of the engagement shaft 136b includes a second circumferential engagement portion 136c in which recesses and ridges are repeated in the circumferential direction. When the engagement shaft 136b is inserted into the engagement tube 131c and the first and second circumferential engagement portions 131d and 136c engage with each other in the circumferential direction, the rotation switch member 136 is rotatable integrally with (non-rotatable relative to) the drive member 131 and is movable with the drive member 131 in the linear direction. The compression coil spring 133 is in a compressed state and located between the disk 136a of the rotation switch member 136 and the disk 131a of the drive member 131 in the axial direction. Thus, the rotation switch member 136 (disk 136a) is in press contact with the bottom portion 135b of the case 135, and the drive member 131 including the valve member 132 is urged toward the discharge port 13. Communication holes 136e extend through the disk 136a of the rotation switch member 136 in the axial direction to allow air to pass through. The rotation switch member 136 closes (allows communication of) at least one of the first to fourth outlets B1 to B4 so that the outlets B1 to B4 that are in communication with the discharge port 13 are switched in accordance with the rotation position.

Figure 29:
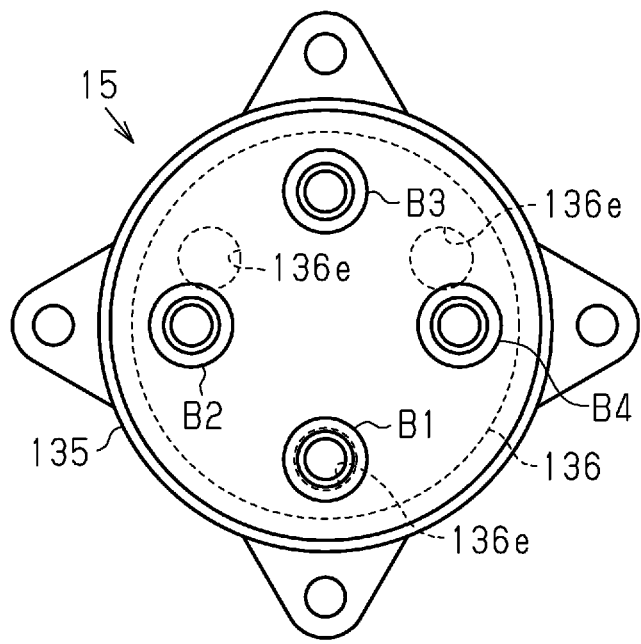
FIG. 29 is a plan view of the flow passage switch shown in FIG. 26.

More specifically, as shown in FIGS. 26 and 29, in the present embodiment, three communication holes 136e are formed at equiangular (120°) intervals and configured so that with each 30° rotation, a different one of the outlets B1 to B4 is sequentially in communication with the discharge port 13 via one of the communication holes 136e. More specifically, in the state shown in FIG. 29, one of the communication holes 136e is located at a position conforming to the first outlet B1. The first outlet B1 is in communication with the discharge port 13 (refer to FIG. 23) via the communication hole 136e. The remaining second to fourth outlets B2 to B4 are closed by the disk 136a and are not in communication with the discharge port 13. For example, when the rotation switch member 136 is rotated 30° from the state shown in FIG. 29 in the counterclockwise direction, the (upper left one in FIG. 29) communication hole 136e is located at a position conforming to the second outlet B2. The second outlet B2 is in communication with the discharge port 13 via the communication holes 136e. When the rotation switch member 136 is further rotated 30° from this state in the counterclockwise direction, the (upper right in FIG. 29) communication hole 136e is located at a position conforming to the third outlet B3. The third outlet B3 is in communication with the discharge port 13 via the communication hole 136e. When the rotation switch member 136 is further rotated 30° from this state in the counterclockwise direction, the (lower in FIG. 29) communication hole 136e is located at a position conforming to the fourth outlet B4. The fourth outlet B4 is in communication with the discharge port 13 via the communication hole 136e. When the rotation switch member 136 is further rotated 30° from this state in the counterclockwise direction, the (upper left in FIG. 29)

communication hole 136e is located at a position conforming to the first outlet B1. The first outlet B1 is in communication with the discharge port 13 via the communication hole 136e. Such a repetition allows the outlets B1 to B4 to be sequentially in communication with the discharge port 13 via the communication holes 136e. In the present embodiment, the inclination angle of the first inclined surfaces 135a and the second inclined surfaces 127c is illustrated in the reverse direction and does not correspond to the rotation direction of the rotation switch member 136 described above.

The operation of the above-described on-board sensor cleaning device will now be described.

As shown in FIG. 23, when the piston 25 is located at the bottom dead position (position farthest from the cylinder end 127), the drive member 131 is located toward the cylinder end 127, and the discharge port 13 is closed by the valve member 132. In this state, the projections 131b of the drive member 131 are fitted between the second inclined surfaces 127c (refer to position Z1 in FIG. 28). Thus, circumferential movement (rotation) of the drive member 131 and the rotation switch member 136 is restricted.

When the motor 12 is driven to move the piston 25 forward, the air in the cylinder 24 is compressed until the piston 25 comes into contact with the shaft 132a of the drive member 131.

Figure 24:
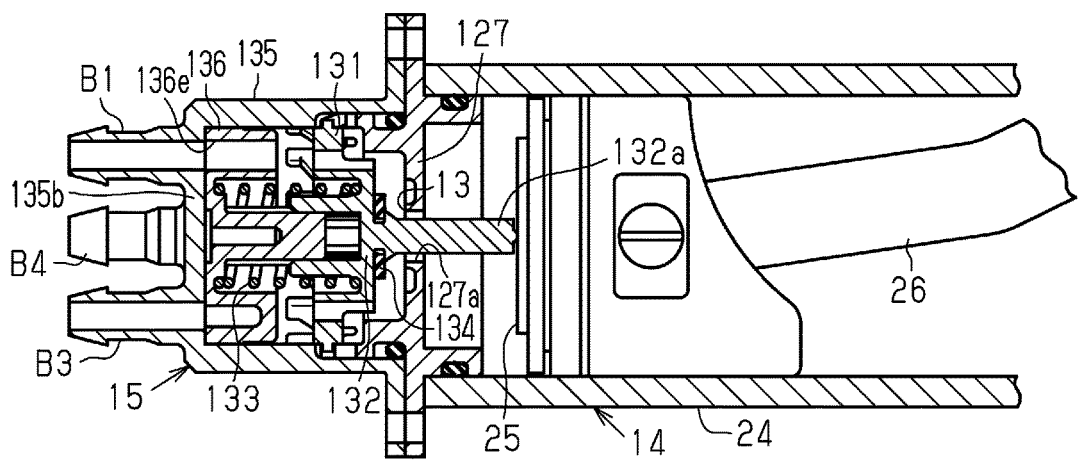
FIG. 24 is a partial cross-sectional view showing the electric pump device of the second embodiment.

As shown in FIG. 24, when the piston 25 is further moved forward, the piston 25 urges the shaft 132a. When the drive member 131 including the valve member 132 is linearly actuated toward the distal side (toward the bottom portion 135b of the case 135) against urging force of the compression coil spring 133, the valve member 132 opens to discharge the compressed air from the discharge port 13. At this time, the air is ejected from, for example, the first outlet B1 located at a position conforming to the communication hole 136e and in communication with the discharge port 13. The air is fed to the first inlet A1 through the hose H (refer to FIG. 1) and ejected from the first nozzle port N1 (refer to FIG. 2) toward the cover glass 4. At this time, the projections 131b of the drive member 131 are linearly actuated toward the distal side (toward bottom portion 135b of the case 135) until the projections 131b come into contact with the first inclined surfaces 135a (refer to position Z2 in FIG. 28). Feeding of air from the discharge port 13 to the outlets B1 to B4 is set to be completed in a state before the projections 131b come into contact with the first inclined surfaces 135a.

Figure 25:
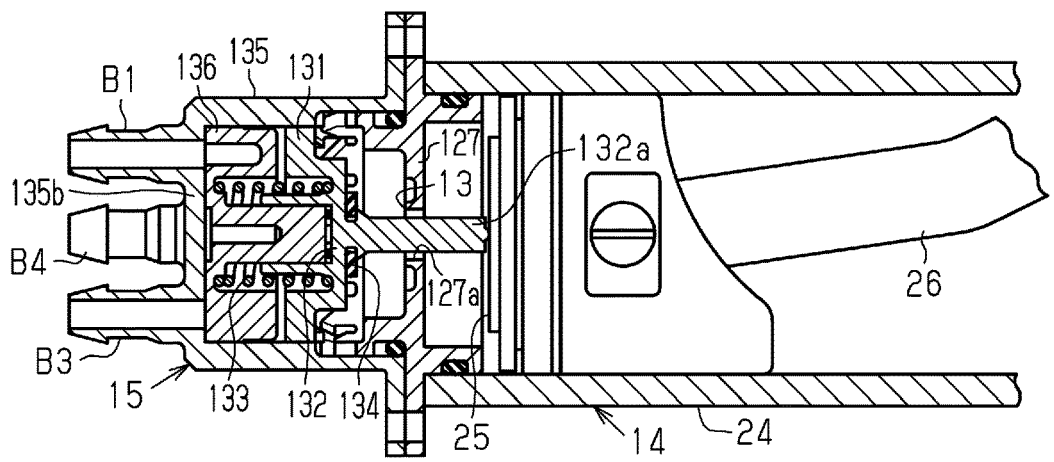
FIG. 25 is a partial cross-sectional view showing the electric pump device of the second embodiment.

As shown in FIG. 25, when forward movement of the piston 25 actuates the drive member 131 (projections 131b) further toward the distal side, the projections 131b (refer to FIG. 28) come into contact with the first inclined surfaces 135a, and the drive member 131 including the projections 131b is guided and rotated in the circumferential direction. The projections 131b are fitted between the first inclined surfaces 135a (refer to position Z3 in FIG. 28).

When the piston 25 is moved backward and the drive member 131 is actuated toward the basal side (toward discharge port 13) by urging force of the compression coil spring 133, the projections 131b come into contact with the second inclined surfaces 127c (refer to position Z4 in FIG. 28), and the drive member 131 including the projections 131b is guided and rotated in the circumferential direction. The projections 131b are fitted between the second inclined surfaces 127c (refer to position Z5 in FIG. 28). At this time, for example, one of the communication holes 136e is located at a position conforming to the second outlet B2. When the valve opens next time, the air is ejected from the second outlet B2, and furthermore, the second nozzle port N2, which is in communication with the discharge port 13.

Repetition of such actuations sequentially ejects the air from the first to fourth nozzle ports N1 to N4 in a predetermined order. In the present embodiment, the predetermined order refers to an order that repeats a pattern in which the nozzle ports N1 to N4 are selected one at a time and each of the nozzle ports N1 to N4 is selected once. The pattern proceeds one by one from a side of one end (in FIG. 2, right side, first nozzle port N1) toward a side of the other end (in FIG. 2, left side, fourth nozzle port N4) in the arrangement direction.

The second embodiment has the advantages described below.

(1) While air is discharged from the discharge port 13 of the pump 14 with driving force of the single motor 12, the flow passage switch 15 switches the outlets B1 to B4 that are in communication with the discharge port 13 with driving force of the same motor 12. When the drive member 131 is linearly urged in the linear direction by driving force of the motor 12, the conversion engagement portion (first inclined surfaces 135a and second inclined surfaces 127c) converts the linear movement of the drive member 131 into rotation in the circumferential direction to rotate the drive member 131. This allows the flow passage switch 15 to switch the outlets B1 to B4 that are in communication with the discharge port 13. With the configuration including the single motor 12, air is sequentially fed from the outlets B1 to B4. As described in the present embodiment, the air is sequentially ejected from the first to fourth nozzle ports N1 to N4. More specifically, in the present embodiment, for example, as compared to a configuration in which an electric pump device (motor and pump) is provided for each of the nozzle ports N1 to N4, the number of electric pump devices 11 (motors 12 and pumps 14) is reduced. The size of the electric pump device 11 is reduced as compared to a configuration that divides the air. Thus, while reducing the size, the air is fed to multiple locations.

(2) When the drive member 131 is rotated, the rotation switch member 136 is integrally rotated to close at least one of the outlets B1 to B6 so that the outlet that is in communication with the discharge port 13 is switched in accordance with the rotation position. More specifically, the fluid is sequentially fed from the outlets B1 to B6.

(3) In a process in which the drive member 131 moves toward one side in the linear direction, the projections 131b of the drive member 131 come into contact with the first inclined surfaces 135a and guide the drive member 131 including the projections 131b in the circumferential direction. In a process in which the drive member 131 moves toward the other side in the linear direction, the projections 131b come into contact with the second inclined surfaces 127c and guide the drive member 131 including the projections 131b in the circumferential direction. Thus, when the drive member 131 is driven and moved forward and backward once in the linear direction, the drive member 131 is rotated in the circumferential direction in accordance with the first inclined surfaces 135a and the second inclined surfaces 127c. More specifically, the fluid is sequentially fed from the outlets B1 to B6.

(4) The drive member 131 is urged and actuated in one direction by driving force of the motor 12 and in the other direction by urging force of the compression coil spring 133. In this configuration, driving force of the motor 12 needs to be transmitted in only one direction. This simplifies the configuration that drivingly couples the motor 12 to the drive member 131. More specifically, as in the present embodiment, the configuration may be simplified so that the drive member 131 needs to be urged only when moving the piston 25 forward.

(5) The drive member 131 is urged and actuated by the piston 25 of the pump 14. Thus, the piston 25 of the pump 14 also functions as a mechanism (mechanism that discharges air) that urges the drive member 131 in one direction. This simplifies the configuration as compared to, for example, a configuration having a separate mechanism that urges the drive member 131.

(6) Feeding of air from the discharge port 13 of the pump 14 to the outlets B1 to B4 is set to be completed in a state before the projections 131*b* come into contact with the first inclined surfaces 135*a*. Thus, before the outlets B1 to B4 that are in communication with the discharge port 13 are switched by rotation of the drive member 131, feeding of air from the outlets B1 to B4 is completed. More specifically, the air will not be ejected while switching the outlets B1 to B4.

(5) The same advantages as advantages (7) to (10) of the first embodiment are obtained.

The second embodiment may be modified as follows.

The second embodiment includes the nozzle ports N1 to N4 in the same manner as the first embodiment. Therefore, the second embodiment may be modified in the same manner as the modified examples of the first embodiment, for example, shown in FIGS. 15 to 17.

Figure 30:
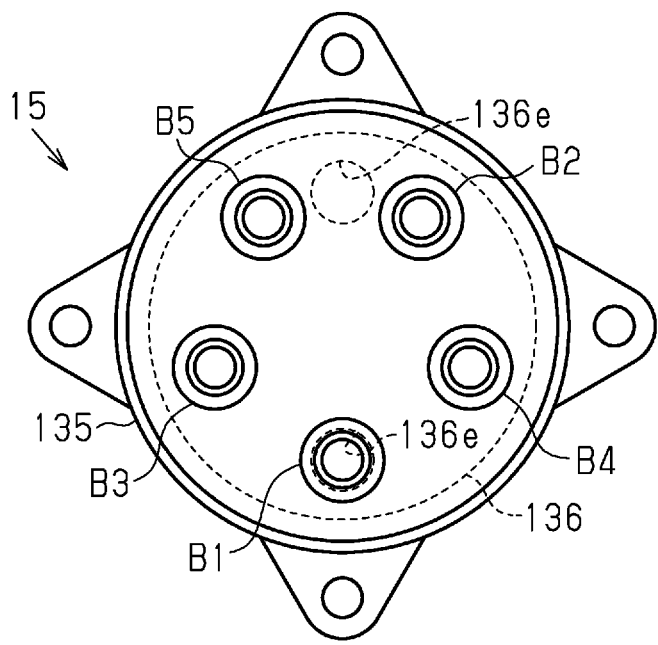
FIG. 30 is a plan view showing a further example of a flow passage switch.

When the five nozzle ports N1 to N5 are included as in the further examples (refer to FIGS. 16 and 17), the flow passage switch 15 needs to be configured to include first to fifth outlets B1 to B5 as shown in FIG. 30. More specifically, in this example (refer to FIG. 30), the flow passage switch 15 includes first to fifth outlets B1 to B5 at equiangular (72°) intervals. Two communication holes 136*e* are formed in the rotation switch member 136 at equiangular (180°) intervals and configured so that whenever the rotation switch member 136 is rotated 36°, a different one of the outlets B1 to B5 is sequentially in communication with one of the communication holes 136*e*. FIG. 30 shows a state in which the first outlet B1 is in communication with the communication hole 136*e*. Whenever the rotation switch member 136 is rotated 36° in the clockwise direction from the present state, the second to fifth outlets B2 to B5 are sequentially in communication with the communication holes 136*e*.

The number of outlets (nozzle ports) and the pattern of the order of air ejection may be changed, for example, as shown in FIGS. 31A to 31F.

Figure 31A:
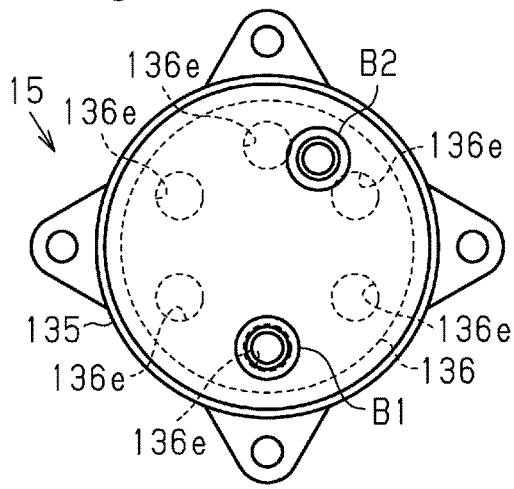
FIGS. 31A to 31F are plan views showing further examples of a flow passage switch.

More specifically, as shown in FIG. 31A, the flow passage switch 15 may include first and second outlets B1 and B2 separated from each other by 150°, and six communication holes 136*e* may be formed in the rotation switch member 136 at equiangular (60°) intervals so that whenever the rotation switch member 136 is rotated 30°, a different one of the outlets B1 and B2 is sequentially in communication with one of the communication holes 136*e*.

Figure 31B:
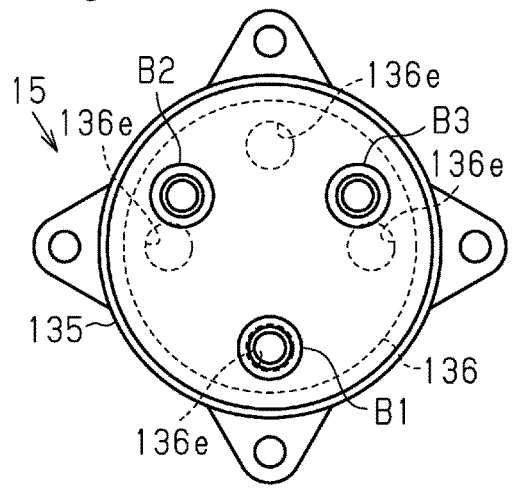

As shown in FIG. 31B, the flow passage switch 15 may include first to third outlets B1 to B3 at equiangular (120°) intervals, and four communication holes 136*e* may be formed in the rotation switch member 136 at equiangular (90°) intervals so that whenever the rotation switch member 136 is rotated 30°, a different one of the outlets B1 to B3 is sequentially in communication with one of the communication holes 136*e*.

Figure 31C:
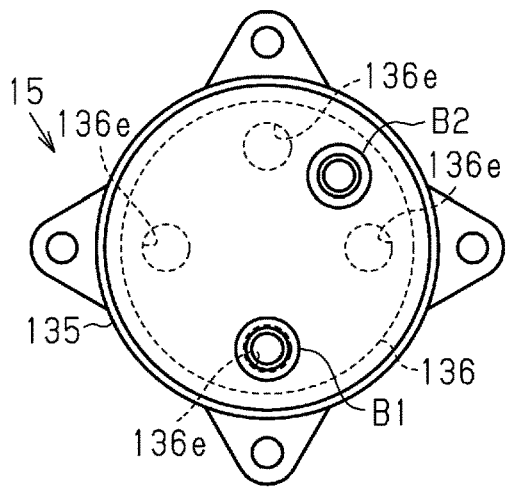

As shown in FIG. 31C, the flow passage switch 15 may include first and second outlets B1 and B2 separated from each other by 135°, and four communication holes 136*e* may be formed in the rotation switch member 136 at equiangular (90°) intervals so that whenever the rotation switch member 136 is rotated 45°, a different one of the outlets B1 and B2 is sequentially in communication with one of the communication holes 136*e*.

Figure 31D:
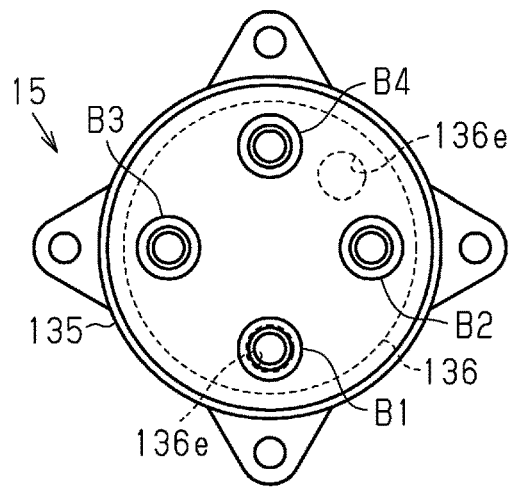

As shown in FIG. 31D, the flow passage switch 15 may include first to fourth outlets B1 to B4 at equiangular (90°) intervals, and two communication holes 136*e* separated from each other by 135° may be formed in the rotation switch member 136 so that whenever the rotation switch member 136 is rotated 45°, a different one of the outlets B1 to B4 is sequentially in communication with one of the communication holes 136*e*. This example does not repeat a pattern in which each of the outlets B1 to B4 (nozzle ports) that are in communication with the communication holes 136*e* is selected once. More specifically, as the rotation switch member 136 is rotated 45° in the clockwise direction from the state shown in FIG. 31D, communication with the communication holes 136*e* is obtained in order of the first outlet B1, the second outlet B2, the third outlet B3, the first outlet B1, the fourth outlet B4, the third outlet B3, the second outlet B2, the fourth outlet B4, and so on.

Figure 31E:
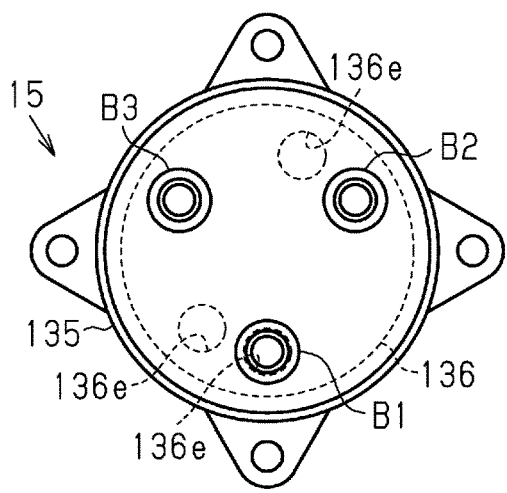

As shown in FIG. 31E, the flow passage switch 15 may include first to third outlets B1 to B3 located at equiangular (120°) intervals, and three communication holes 37*d*, namely, a reference communication hole 136*e*, a communication hole 37*d* separated by 40° from the reference communication hole 136*e* in the clockwise direction, and a communication hole 136*e* separated by 160° from the reference communication hole 136*e* in the counterclockwise direction, may be formed in the rotation switch member 136. Whenever the rotation switch member 136 is rotated 40°, a different one of the outlets B1 to B3 is sequentially in communication with one of the communication holes 136*e*. This example does not repeat a pattern in which each of the outlets B1 to B3 (nozzle ports) that are in communication with the communication holes 136*e* is selected once. More specifically, as the rotation switch member 136 is rotated 40° in the clockwise direction from the state shown in FIG. 31E, communication with the communication holes 136*e* is established in order of the first outlet B1, the second outlet B2, the third outlet B3, the third outlet B3, the first outlet B1, the second outlet B2, the second outlet B2, the third outlet B3, the first outlet B1, and so on.

Figure 31F:
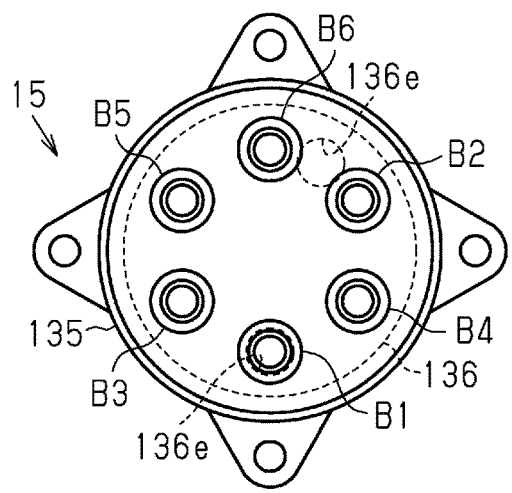

As shown in FIG. 31F, the flow passage switch 15 may include first to sixth outlets B1 to B6 at equiangular (60°) intervals, and two communication holes 136*e* separated from each other by 150° may be formed in the rotation switch member 136 so that whenever the rotation switch member 136 is rotated by 30°, a different one of the outlets B1 to B6 is sequentially in communication with one of the communication holes 136*e*. This example does not repeat a pattern in which each of the outlets B1 to B6 (nozzle ports) that are in communication with the communication holes 136*e* is selected once. More specifically, as the rotation switch member 136 is rotated 30° in the clockwise direction from the state shown in FIG. 31F, communication with the communication holes 136*e* is established in order of the first outlet B1, the second outlet B2, the third outlet B3, the fourth outlet B4, the fifth outlet B5, the first outlet B1, the sixth outlet B6, the third outlet B3, the second outlet B2, the fifth outlet B5, the fourth outlet B4, the sixth outlet B6, and so on.

In the second embodiment, the electric pump device 11 is configured so that the motor 12, the pump 14, and the flow passage switch 15 are arranged integrally with each other. Instead, the motor 12, the pump 14, and the flow passage switch 15 may be configured not to be integrally arranged (may be arranged in different casings).

The electric pump device 11 of the second embodiment and the electric pump device 11 of the first embodiment have common configurations. The common configurations may be the same as the configurations of the first embodiment. More specifically, the second embodiment may be modified in the same manner as the modified examples of the first embodiment, for example, shown in FIGS. 20 to 22.

The configuration of the flow passage switch 15 of the second embodiment may be changed to another configuration that includes multiple outlets configured to be in communication with a discharge port of a pump and switches the outlet that is in communication with the discharge port with driving force of a motor that drives the pump.

In the second embodiment, the drive member 131 is configured to be urged and actuated by driving force of the motor 12 in one direction and urged and actuated by urging force of the compression coil spring 133 in the other direction. Instead, for example, the linear movement member 131 may be configured to be urged and actuated by driving force of a motor in one direction and the other direction.

In the embodiment, the drive member 131 is configured to be urged and actuated by the piston 25 of the pump 14. Instead, for example, the configuration may include a separate mechanism that urges the drive member 131 with driving force of the motor 12.

In the embodiment, the drive member 31 is configured to be urged and actuated by the piston 25 of the pump 14. Instead, for example, the configuration may include a separate mechanism that urges the drive member 31 with driving force of the motor 12.

In the second embodiment, the first to fourth nozzle ports N1 to N4 are configured to eject air toward the single cover glass 4. Instead, the first to fourth nozzle ports N1 to N4 may eject air toward multiple sensing surfaces (e.g., cover glass or lens). The on-board sensor cleaning device may be configured to perform cleaning by ejecting fluid such as cleaning liquid instead of air.

In the second embodiment, the outer surface of the cover glass 4 is flat. Instead, for example, the outer surface may be curved defining a curved surface.

In the second embodiment, although not particularly described, ejection of air from all of the nozzle ports N1 to N4 may be defined as a cycle, and when stopping, the actuation may be continued until the cycle is completed. More specifically, for example, a controller that controls the electric pump device 11 may always eject air from the first outlet B1 when starting. When receiving a signal to stop and during subsequent stopping, the controller may drive the motor 12 until air is ejected from the forth (the last in cycle) outlet B4. Such a configuration avoids a situation in which, for example, the actuation is stopped without cleaning a portion of the sensing surface. The sensing surface corresponding to each of the nozzle ports N1 to N4 is evenly cleaned.

The invention claimed is:

1. An electric pump device, comprising:
a single motor;
a pump that discharges fluid from a discharge port with driving force of the motor; and
a flow passage switch that includes outlets configured to be in communication with the discharge port and switches an outlet of the outlets that is in communication with the discharge port with the driving force of the motor, wherein the flow passage switch includes:
a linear movement member linearly actuated by the driving force of the motor; and
a rotation member contactable with the linear movement member in a linear actuation direction of the linear movement member, wherein when linear actuation of the linear movement member urges the rotation member, the rotation member is rotated in a circumferential direction to switch the outlet that is in communication with the discharge port, and
the electric pump device is set so that feeding of fluid from the discharge port of the pump to the outlets is completed in a state before the rotation member is rotated in the circumferential direction by the linear actuation of the linear movement member.

2. The electric pump device according to claim 1, wherein
at least one of the linear movement member or the rotation member includes an inclined surface inclined in the circumferential direction, and
the inclined surface converts linear actuation of the linear movement member into rotary actuation of the rotation member.

3. The electric pump device according to claim 1, wherein
the linear movement member is urged and actuated in one direction by the driving force of the motor, and
the flow passage switch includes an urging member that urges the linear movement member in another direction.

4. The electric pump device according to claim 1, wherein
the pump includes a cylinder and a piston that reciprocates in the cylinder with the driving force of the motor, and
the linear movement member is urged and actuated by the piston.

5. The electric pump device according to claim 1, wherein the motor, the pump, and the flow passage switch are arranged integrally with each other.

6. An electric pump device, comprising:
a single motor;
a pump that discharges fluid from a discharge port with driving force of the motor; and
a flow passage switch that includes outlets configured to be in communication with the discharge port and switches an outlet of the outlets that is in communication with the discharge port with the driving force of the motor, wherein
the flow passage switch includes:
a linear movement member linearly actuated by the driving force of the motor; and
a rotation member contactable with the linear movement member in a linear actuation direction of the linear movement member, wherein when the linear actuation of the linear movement member urges the rotation member, the rotation member is rotated in a circumferential direction to switch the outlet that is in communication with the discharge port,
the rotation member includes a linear movement rotation member and a rotation switch member,
the linear movement rotation member is contactable with the linear movement member in the linear actuation direction, wherein when linear actuation of the linear movement member urges the linear movement rotation member, the linear movement rotation member is linearly actuated together with the linear movement member to a predetermined position, and beyond the predetermined position, the linear movement rotation member is rotated in the circumferential direction, the rotation switch member is arranged to be rotatable integrally with the linear movement rotation member and movable with the linear movement rotation member in the linear actuation direction, and the rotation switch member closes at least one of the outlets to switch the outlet that is in communication with the discharge port in accordance with a rotation position.

7. The electric pump device according to claim 6, wherein at least one of the linear movement member or the rotation member includes an inclined surface inclined in the circumferential direction, and the inclined surface converts the linear actuation of the linear movement member into rotary actuation of the rotation member.

8. The electric pump device according to claim 6, wherein the linear movement member is urged and actuated in one direction by driving force of the motor, and the flow passage switch includes an urging member that urges the linear movement member in another direction.

9. The electric pump device according to claim 6, wherein the pump includes a cylinder and a piston that reciprocates in the cylinder with the driving force of the motor, and the linear movement member is urged and actuated by the piston.

10. The electric pump device according to claim 6, wherein the motor, the pump, and the flow passage switch are arranged integrally with each other.

11. An electric pump device, comprising:

a single motor;

a pump that discharges fluid from a discharge port with driving force of the motor; and a flow passage switch that includes outlets configured to be in communication with the discharge port and switches an outlet of the outlets that is in communication with the discharge port with the driving force of the motor, wherein the flow passage switch includes a drive member that is urged and driven by the driving force of the motor in a linear direction and a conversion engagement portion that converts movement of the drive member in the linear direction into rotation in a circumferential direction, rotation of the drive member switches the outlet that is in communication with the discharge port, the drive member includes a projection projecting in an outer direction orthogonal to the linear direction, the conversion engagement portion includes a first inclined surface and a second inclined surface, the first inclined surface is arranged on an inner circumferential surface of a case that accommodates the drive member, in a process in which the drive member moves toward one side in the linear direction, the first inclined surface comes into contact with the projection and guides the drive member including the projection in a circumferential direction, and in a process in which the drive member moves toward another side in the linear direction, the second inclined surface comes into contact with the projection and guides the drive member including the projection in the circumferential direction.

12. The electric pump device according to claim 11, wherein the flow passage switch includes a rotation switch member, the rotation switch member is arranged to be rotatable integrally with the drive member and movable with the drive member in the linear direction, and the rotation switch member closes at least one of the outlets to switch the outlet that is in communication with the discharge port in accordance with a rotation position of the rotation switch member.

13. The electric pump device according to claim 11, wherein the electric pump is set so that feeding of fluid from the discharge port of the pump to the outlets is completed in a state before the projection comes into contact with the first inclined surface.

14. The electric pump device according to claim 11, wherein the drive member is urged and actuated by the driving force of the motor in one direction, and the flow passage switch includes an urging member that urges the drive member in another direction.

15. The electric pump device according to claim 11, wherein the pump includes a cylinder and a piston that reciprocates in the cylinder with the driving force of the motor, and the drive member is urged and actuated by the piston.

16. The electric pump device according to claim 11, wherein the motor, the pump, and the flow passage switch are arranged integrally with each other.

* * * * *